(12) United States Patent
Cervelli et al.

(10) Patent No.: US 11,275,753 B2
(45) Date of Patent: \*Mar. 15, 2022

(54) SCHEMATIC AND DATABASE LINKING SYSTEM

(71) Applicant: Palantir Technologies Inc., Palo Alto, CA (US)

(72) Inventors: Daniel Cervelli, Mountain View, CA (US); David Tobin, Atherton, CA (US); Feridun Arda Kara, New York, NY (US); Trevor Sontag, Palo Alto, CA (US); David Skiff, Redwood City, CA (US); John Carrino, Redwood City, CA (US); Allen Chang, Mountain View, CA (US); John Garrod, Palo Alto, CA (US); Agatha Yu, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 443 days.

This patent is subject to a terminal disclaimer.

(21) Appl. No.: 15/959,016

(22) Filed: Apr. 20, 2018

(65) Prior Publication Data

US 2018/0239768 A1  Aug. 23, 2018

Related U.S. Application Data

(63) Continuation of application No. 14/883,498, filed on Oct. 14, 2015, now Pat. No. 9,984,133.

(Continued)

(51) Int. Cl.
*G06F 16/25* (2019.01)
*G06F 16/93* (2019.01)
(Continued)

(52) U.S. Cl.
CPC .......... *G06F 16/252* (2019.01); *G06F 16/248* (2019.01); *G06F 16/24575* (2019.01); *G06F 16/94* (2019.01); *G06F 16/9535* (2019.01)

(58) Field of Classification Search
CPC ...... G06F 16/252; G06F 16/94; G06F 16/248; G06F 16/24575; G06F 16/9535
See application file for complete search history.

(56) References Cited

U.S. PATENT DOCUMENTS 4,881,179 A   11/1989  Vincent
5,109,399 A    4/1992  Thompson
(Continued)

FOREIGN PATENT DOCUMENTS

AU   2013251186   11/2015
CN    102054015    5/2014
(Continued)

OTHER PUBLICATIONS

"A First Look: Predicting Market Demand for Food Retail using a Huff Analysis," TRF Policy Solutions, Jul. 2012, p. 30.
(Continued)

*Primary Examiner* — Miranda Le
(74) *Attorney, Agent, or Firm* — Knobbe Martens Olson & Bear LLP

(57) ABSTRACT

Various systems and methods are provided that display schematics and data associated with the various physical components in the schematics in an interactive user interface. For example, a computing device links data stored in one or more databases with schematics displayed in one or more interactive user interfaces. The computing device parses a digital image that depicts a schematic and identifies text visible in the digital image. Based on the identified text, the computing device recognizes representations of one or more physical components in the schematic and links the (Continued)

representations to data regarding the physical component in one or more databases, such as specification data, historical sensor data of the component, etc. The computing device modifies the digital image such that it becomes interactive and visible in a user interface in a manner that allows the user to select a physical component and view data associated with the selection.

18 Claims, 23 Drawing Sheets

Related U.S. Application Data

(60) Provisional application No. 62/064,793, filed on Oct. 16, 2014.

(51) Int. Cl.
*G06F 16/248* (2019.01)
*G06F 16/9535* (2019.01)
*G06F 16/2457* (2019.01)

(56) References Cited

U.S. PATENT DOCUMENTS

| | | |
|---|---|---|
| 5,241,625 A | 8/1993 | Epard et al. |
| 5,329,108 A | 7/1994 | Lamoure |
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 5,999,911 A | 12/1999 | Berg et al. |
| 6,057,757 A | 5/2000 | Arrowsmith et al. |
| 6,065,026 A | 5/2000 | Cornelia et al. |
| 6,091,956 A | 7/2000 | Hollenberg |
| 6,101,479 A | 8/2000 | Shaw |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,374,251 B1 | 4/2002 | Fayyad et al. |
| 6,430,305 B1 | 8/2002 | Decker |
| 6,456,997 B1 | 9/2002 | Shukla |
| 6,523,019 B1 | 2/2003 | Borthwick |
| 6,530,065 B1 * | 3/2003 | McDonald .......... G06F 30/367 716/102 |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,665,683 B1 | 12/2003 | Meltzer |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,042,469 B2 | 5/2006 | Fuller |
| 7,043,702 B2 | 5/2006 | Chi et al. |
| 7,055,110 B2 | 5/2006 | Kupka et al. |
| 7,072,801 B2 | 7/2006 | James |
| 7,086,028 B1 | 8/2006 | Davis et al. |
| 7,139,800 B2 | 11/2006 | Bellotti et al. |
| 7,143,363 B1 | 11/2006 | Gaynor et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,257,793 B2 | 8/2007 | Okano et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,426,654 B2 | 9/2008 | Adams et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,140 B1 | 5/2010 | Nielsen et al. |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,761,834 B2 * | 7/2010 | McConaghy .......... G06F 30/30 716/132 |
| 7,765,489 B1 | 7/2010 | Shah |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,814,123 B2 | 10/2010 | Nguyen et al. |
| 7,818,291 B2 | 10/2010 | Ferguson et al. |
| 7,818,658 B2 | 10/2010 | Chen |
| 7,870,493 B2 | 1/2011 | Pall et al. |
| 7,877,421 B2 | 1/2011 | Berger et al. |
| 7,880,921 B2 | 2/2011 | Dattilo et al. |
| 7,890,868 B2 | 2/2011 | Shah et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,336 B1 | 5/2011 | Robin-Jan |
| 7,958,147 B1 | 6/2011 | Turner et al. |
| 7,962,848 B2 | 6/2011 | Bertram |
| 7,966,199 B1 | 6/2011 | Frasher |
| 8,001,465 B2 | 8/2011 | Kudrolli et al. |

(56) References Cited

U.S. PATENT DOCUMENTS

| | | |
|---|---|---|
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,042,110 B1 | 10/2011 | Kawahara et al. |
| 8,073,857 B2 | 12/2011 | Sreekanth |
| 8,103,543 B1 | 1/2012 | Zwicky |
| 8,134,457 B2 | 3/2012 | Velipasalar et al. |
| 8,135,484 B2 | 3/2012 | Yamazaki et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Aime |
| 8,352,881 B2 | 1/2013 | Champion et al. |
| 8,368,695 B2 | 2/2013 | Howell et al. |
| 8,386,377 B1 | 2/2013 | Xiong et al. |
| 8,392,556 B2 | 3/2013 | Goulet et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,069,842 B2 | 6/2015 | Melby |
| 9,116,975 B2 | 8/2015 | Shankar et al. |
| 9,148,349 B1 | 9/2015 | Burr et al. |
| 9,165,100 B2 | 10/2015 | Begur et al. |
| 9,223,773 B2 | 12/2015 | Isaacson |
| 9,286,373 B2 | 3/2016 | Elliot et al. |
| 9,298,678 B2 | 3/2016 | Chakerian et al. |
| 9,348,880 B1 | 5/2016 | Kramer et al. |
| 9,367,872 B1 | 6/2016 | Visbal et al. |
| 9,984,133 B2 | 5/2018 | Cervelli et al. |
| 2001/0021936 A1 | 9/2001 | Bertram |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0077711 A1* | 6/2002 | Nixon ............... G05B 23/0272 700/51 |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0123864 A1 | 9/2002 | Eryurek et al. |
| 2002/0130907 A1 | 9/2002 | Chi et al. |
| 2002/0174201 A1 | 11/2002 | Ramer et al. |
| 2002/0193969 A1 | 12/2002 | Frantz et al. |
| 2002/0194119 A1 | 12/2002 | Wright et al. |
| 2002/0196229 A1 | 12/2002 | Chen et al. |
| 2003/0028269 A1 | 2/2003 | Spriggs et al. |
| 2003/0028560 A1 | 2/2003 | Kudrolli et al. |
| 2003/0036848 A1 | 2/2003 | Sheha et al. |
| 2003/0036927 A1 | 2/2003 | Bowen |
| 2003/0039948 A1 | 2/2003 | Donahue |
| 2003/0061132 A1 | 3/2003 | Mason et al. |
| 2003/0093755 A1 | 5/2003 | O'Carroll |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0078451 A1 | 4/2004 | Dietz et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |

(56) References Cited

U.S. PATENT DOCUMENTS

| | | |
|---|---|---|
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Di Franco et al. |
| 2005/0143096 A1 | 6/2005 | Boesch |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0183043 A1* | 8/2005 | Wu .................. G06F 30/30 716/102 |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0203337 A1 | 9/2006 | White |
| 2006/0218637 A1 | 9/2006 | Thomas et al. |
| 2006/0236303 A1* | 10/2006 | Wilson .................. G06F 8/60 717/104 |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0018986 A1 | 1/2007 | Hauser |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0150369 A1 | 6/2007 | Zivin |
| 2007/0162454 A1 | 7/2007 | D'Albora et al. |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2007/0300198 A1 | 12/2007 | Chaplin et al. |
| 2008/0016155 A1 | 1/2008 | Khalatian |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0046481 A1 | 2/2008 | Gould et al. |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0208735 A1 | 8/2008 | Balet et al. |
| 2008/0222295 A1 | 9/2008 | Robinson et al. |
| 2008/0227473 A1 | 9/2008 | Haney |
| 2008/0249820 A1 | 10/2008 | Pathria |
| 2008/0249983 A1 | 10/2008 | Meisels et al. |
| 2008/0263468 A1 | 10/2008 | Cappione et al. |
| 2008/0267107 A1 | 10/2008 | Rosenberg |
| 2008/0270328 A1 | 10/2008 | Lafferty et al. |
| 2008/0276167 A1 | 11/2008 | Michael |
| 2008/0278311 A1 | 11/2008 | Grange et al. |
| 2008/0281819 A1 | 11/2008 | Tenenbaum et al. |
| 2008/0288306 A1 | 11/2008 | MacIntyre et al. |
| 2008/0288475 A1 | 11/2008 | Kim et al. |
| 2008/0301042 A1 | 12/2008 | Patzer |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2008/0313281 A1 | 12/2008 | Scheidl et al. |
| 2009/0002492 A1 | 1/2009 | Velipasalar et al. |
| 2009/0018996 A1 | 1/2009 | Hunt et al. |
| 2009/0024962 A1 | 1/2009 | Gotz |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0037912 A1 | 2/2009 | Stoitsev et al. |
| 2009/0043801 A1 | 2/2009 | LeClair |
| 2009/0055251 A1 | 2/2009 | Shah et al. |
| 2009/0070162 A1 | 3/2009 | Leonelli et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0094270 A1 | 4/2009 | Alirez et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |

(56) References Cited

U.S. PATENT DOCUMENTS

| | | |
|---|---|---|
| 2009/0144274 A1 | 6/2009 | Fraleigh et al. |
| 2009/0150868 A1 | 6/2009 | Chakra et al. |
| 2009/0157732 A1 | 6/2009 | Hao et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228365 A1 | 9/2009 | Tomchek et al. |
| 2009/0234720 A1 | 9/2009 | George et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0300589 A1 | 12/2009 | Watters et al. |
| 2009/0307049 A1 | 12/2009 | Elliott et al. |
| 2009/0313463 A1 | 12/2009 | Pang et al. |
| 2009/0318775 A1 | 12/2009 | Michelson et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0058212 A1 | 3/2010 | Belitz et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106752 A1 | 4/2010 | Eckardt et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0223260 A1 | 9/2010 | Wu |
| 2010/0228812 A1 | 9/2010 | Uomini |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0004626 A1 | 1/2011 | Naeymi-Rad et al. |
| 2011/0029526 A1 | 2/2011 | Knight et al. |
| 2011/0035721 A1 | 2/2011 | Shimoyama et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161409 A1 | 6/2011 | Nair |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0225586 A1 | 9/2011 | Bentley et al. |
| 2011/0225650 A1 | 9/2011 | Margolies et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270705 A1 | 11/2011 | Parker |
| 2011/0276938 A1* | 11/2011 | Perry ..................... G06F 30/36 716/133 |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler |
| 2012/0004904 A1 | 1/2012 | Shin et al. |
| 2012/0015673 A1 | 1/2012 | Klassen et al. |
| 2012/0019559 A1 | 1/2012 | Siler et al. |
| 2012/0022945 A1 | 1/2012 | Falkenberg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0059853 A1 | 3/2012 | Jagota |
| 2012/0065987 A1 | 3/2012 | Farooq et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |

(56) References Cited

U.S. PATENT DOCUMENTS

| | | |
|---|---|---|
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0283988 A1 | 11/2012 | Pandey et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0005362 A1 | 1/2013 | Borghei |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0055264 A1 | 2/2013 | Burr et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124567 A1 | 5/2013 | Balinsky et al. |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0197925 A1 | 8/2013 | Blue |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0274898 A1 | 10/2013 | Thatikonda et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2013/0325826 A1 | 12/2013 | Agarwal et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081685 A1 | 3/2014 | Thacker et al. |
| 2014/0089339 A1 | 3/2014 | Siddiqui et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0129936 A1 | 5/2014 | Richards et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0178845 A1 | 6/2014 | Riesberg et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0282177 A1 | 9/2014 | Wang et al. |
| 2014/0310266 A1 | 10/2014 | Greenfield |
| 2014/0316911 A1 | 10/2014 | Gross |
| 2014/0320145 A1 | 10/2014 | Johnson et al. |
| 2014/0330845 A1 | 11/2014 | Feldschuh |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0046870 A1 | 2/2015 | Goldenberg et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0212663 A1 | 7/2015 | Papale et al. |
| 2015/0221203 A1 | 8/2015 | Concepcion et al. |
| 2015/0227295 A1 | 8/2015 | Meiklejohn et al. |
| 2015/0242401 A1 | 8/2015 | Liu |

(56) References Cited

U.S. PATENT DOCUMENTS

| | | |
|---|---|---|
| 2015/0254220 A1 | 9/2015 | Burr et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| DE | 102014103482 | 9/2014 |
| DE | 102014215621 | 2/2015 |
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| EP | 3002691 | 4/2016 |
| EP | 3009943 | 4/2016 |
| EP | 3032441 | 6/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 01/025906 | 4/2001 |
| WO | WO 2001/088750 | 11/2001 |
| WO | WO 2002/065353 | 8/2002 |
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/119008 | 9/2012 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, p. 2.
"A Word About Banks and the Laundering of Drug Money," Aug. 18, 2012, http://www.golemxiv.co.uk/2012/08/a-word-about-banks-and-the-laundering-of-drug-money/.
Abbey, Kristen, "Review of Google Docs," May 1, 2007, p. 2.
Acklen, Laura, "Absolute Beginner's Guide to Microsoft Word 2003," Dec. 24, 2003, pp. 15-18, 34-41, 308-316.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/De sktop/javase6/modality/ Jan. 21, 2006, p. 8.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"The FASTA Program Package," fasta-36.3.4, Mar. 25, 2011, pp. 29.
Galliford, Miles, "SnagIt Versus Free Screen Capture Software: Critical Tools for Website Owners," <http://www.subhub.com/articles/free-screen-capture-software>, Mar. 27, 2008, pp. 11.
GIS-NET 3 Public _ Department of Regional Planning. Planning & Zoning Information for Unincorporated La County. Retrieved Oct. 2, 2013 from http://gis.planning.lacounty.gov/GIS-NET3 Public/Viewer.html.
Glaab et al., "EnrichNet: Network-Based Gene Set Enrichment Analysis," Bioinformatics 28.18 (2012): pp. i451-i457.
Goswami, Gautam, "Quite Writly Said!," One Brick at a Time, Aug. 21, 2005, pp. 7.
"GrabUp—What a Timesaver!" <http://atlchris.com/191/grabup/>, Aug. 11, 2008, pp. 3.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News On Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.

(56) References Cited

OTHER PUBLICATIONS

Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1,2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Hur et al., "SciMiner: web-based literature mining tool for target identification and functional enrichment analysis," Bioinformatics 25.6 (2009): pp. 838-840.
jetscreenshot.com, "Share Screenshots via Internet in Seconds," <http://web.archive.org/web/20130807164204/http://www.jetscreenshot.com/>, Aug. 7, 2013, pp. 1.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
keylines.com, "KeyLines Datasheet," Mar. 2014, <http://keylines.com/wp-content/uploads/2014/03/KeyLines-datasheet.pdf> downloaded May 12, 2014 in 2 pages.
keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kwout, <http://web.archive.org/web/20080905132448/http://www.kwout.com/> Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-US/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1 > printed Aug. 4, 2011 in 1 page.
Microsoft Windows, "Microsoft Windows Version 2002 Print Out 2," 2002, pp. 1-6.
Microsoft, "Registering an Application to a URI Scheme," <http://msdn.microsoft.com/en-US/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", 6 pages, 2002.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Online Tech Tips, "Clip2Net—Share files, folders and screenshots easily," <http://www.online-tech-tips.com/free-software-downloads/share-files-folders-screenshots/>, Apr. 2, 2008, pp. 5.
o'reilly.com, http://oreilly.com/digitalmedia/2006/01/01/mac-os-x-screenshot-secrets.html published Jan. 1, 2006 in 10 pages.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
Quest, "Toad for ORACLE 11.6—Guide to Using Toad," Sep. 24, 2012, pp. 1-162.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," <http://searchdatamanagement.techtarget.com/definition/OLAP-cube>, Apr. 28, 2012, pp. 16.
Schroder, Stan, "15 Ways To Create Website Screenshots," <http://mashable.com/2007/08/24/web-screenshots/>, Aug. 24, 2007, pp. 2.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
Wang et al., "Research on a Clustering Data De-Duplication Mechanism Based on Bloom Filter," IEEE 2010, 5 pages.

(56) References Cited

OTHER PUBLICATIONS

Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Federated Database System," Sep. 7, 2013, retrieved from the internet on Jan. 27, 2015 http://en.wikipedia.org/w/index.php?title=Federated database system&oldid=571954221.
Yang et al., "HTML Page Analysis Based on Visual Cues", A129, pp. 859-864, 2001.
Zheng et al., "GOEAST: a web-based software toolkit for Gene Ontology enrichment analysis," Nucleic acids research 36.suppl 2 (2008): pp. W385-W363.
Notice of Acceptance for Australian Patent Application No. 2014250678 dated Oct. 7, 2015.
Notice of Acceptance for Australian Patent Application No. 2013251186 dated Nov. 6, 2015.
Notice of Allowance for U.S. Appl. No. 12/556,318 dated Apr. 11, 2016.
Notice of Allowance for U.S. Appl. No. 12/556,318 dated Nov. 2, 2015.
Notice of Allowance for U.S. Appl. No. 13/247,987 dated Mar. 17, 2016.
Notice of Allowance for U.S. Appl. No. 13/839,026 dated Mar. 11, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/192,767 dated Apr. 20, 2015.
Notice of Allowance for U.S. Appl. No. 14/225,084 dated May 4, 2015.
Notice of Allowance for U.S. Appl. No. 14/265,637 dated Feb. 13, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/579,752 dated Apr. 4, 2016.
Notice of Allowance for U.S. Appl. No. 14/616,080 dated Apr. 2, 2015.
Notice of Allowance for U.S. Appl. No. 14/676,621 dated Feb. 10, 2016.
Notice of Allowance for U.S. Appl. No. 14/961,481 dated May 2, 2016.
Official Communication for Australian Patent Application No. 2013251186 dated Mar. 12, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180321.3 dated May 9, 2016.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14187996.5 dated Feb. 19, 2016.
Official Communication for European Patent Application No. 14189344.6 dated Feb. 20, 2015.
Official Communication for European Patent Application No. 14189344.6 dated Feb. 29, 2016.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for European Patent Application No. 15188106.7 dated Feb. 3, 2016.
Official Communication for European Patent Application No. 15190307.7 dated Feb. 19, 2016.
Official Communication for European Patent Application No. 15190307.7 dated Sep. 26, 2017.
Official Communication for Great Britain Patent Application No. 1404457.2 dated Aug. 14, 2014.

(56) References Cited

OTHER PUBLICATIONS

Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2011729 dated Aug. 13, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/669,274 dated Aug. 26, 2015.
Official Communication for U.S. Appl. No. 13/669,274 dated May 2, 2016.
Official Communication for U.S. Appl. No. 13/669,274 dated May 6, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/831,791 dated Feb. 11, 2016.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/835,688 dated Sep. 30, 2015.
Official Communication for U.S. Appl. No. 13/835,688 dated Jun. 7, 2016.
Official Communication for U.S. Appl. No. 13/839,026 dated Aug. 4, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/134,558 dated Oct. 7, 2015.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/148,568 dated Mar. 27, 2014.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated Aug. 13, 2014.
Official Communication for U.S. Appl. No. 14/196,814 dated May 5, 2015.
Official Communication for U.S. Appl. No. 14/196,814 dated Oct. 7, 2015.
Official Communication for U.S. Appl. No. 14/222,364 dated Dec. 9, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.

(56) References Cited

OTHER PUBLICATIONS

Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/265,637 dated Sep. 26, 2014.
Official Communication for U.S. Appl. No. 14/268,964 dated Jul. 11, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,596 dated May 9, 2016.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/479,160 dated Apr. 20, 2016.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/516,386 dated Feb. 24, 2016.
Official Communication for U.S. Appl. No. 14/552,336 dated Jul. 20, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/631,633 dated Feb. 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/676,621 dated Oct. 29, 2015.

(56) References Cited

OTHER PUBLICATIONS

Official Communication for U.S. Appl. No. 14/676,621 dated Jul. 30, 2015.
Official Communication for U.S. Appl. No. 14/715,834 dated Apr. 13, 2016.
Official Communication for U.S. Appl. No. 14/715,834 dated Feb. 19, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/741,256 dated Feb. 9, 2016.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/841,338 dated Feb. 18, 2016.
Official Communication for U.S. Appl. No. 14/842,734 dated Nov. 19, 2015.
Official Communication for U.S. Appl. No. 14/871,465 dated Apr. 11, 2016.
Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/961,481 dated Mar. 2, 2016.
Official Communication for U.S. Appl. No. 14/975,215 dated May 19, 2016.
Restriction Requirement for U.S. Appl. No. 13/839,026 dated Apr. 2, 2015.
Ferreira et al., "A Scheme for Analyzing Electronic Payment Systems," Brazil 1997.
Notice of Allowance for U.S. Appl. No. 14/883,498 dated Jan. 31, 2018.
Official Communication for U.S. Appl. No. 14/332,306 dated May 20, 2016.
Official Communication for U.S. Appl. No. 14/715,834 dated Jun. 28, 2016.
Official Communication for U.S. Appl. No. 14/883,498 dated Aug. 10, 2017.
Official Communication for U.S. Appl. No. 14/883,498 dated Aug. 22, 2016.
Official Communication for U.S. Appl. No. 14/883,498 dated Feb. 9, 2017.
Official Communication for European Patent Application No. 15190307.7 dated Apr. 16, 2018.

* cited by examiner

FIG. 4F

SCHEMATIC AND DATABASE LINKING SYSTEM

CROSS-REFERENCE TO RELATED APPLICATIONS

This application is a continuation of U.S. patent application Ser. No. 14/883,498, entitled "SCHEMATIC AND DATABASE LINKING SYSTEM" and filed on Oct. 14, 2015, which is hereby incorporated by reference herein in its entirety.

TECHNICAL FIELD

The present disclosure relates to systems and techniques for querying databases and displaying queried data in an interactive user interface.

BACKGROUND

A database may store a large quantity of data. For example, a system may comprise a large number of physical components that are each associated with measurements collected at regular intervals, and the measurements may be stored in the database and/or a system of databases. The measurement data can be supplemented with other data, such as information that describes each physical component, and the supplemental data can also be stored in the database and/or the system of databases. References herein to a "database" may refer to any type of data structure for storing and/or organizing data, including, but not limited to, relational databases (for example, Oracle database, mySQL database, and the like), spreadsheets, XML files, and text files, among others.

In some cases, a user may attempt to analyze a portion of the stored data. For example, the user may attempt to analyze a portion of the stored data that is associated with one or more physical components. However, as the number of measurements increases over time, it can become very difficult for the user to identify the relevant data and perform the analysis.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for displaying schematics (or other visual representations of multi-component systems) and data associated with various physical components in the schematics in an interactive user interface. For example, a computing device may be configured to link data stored in one or more databases with particular portions of schematics that can be displayed in one or more interactive user interfaces. The computing device may parse a digital image that depicts a schematic and identify text visible in the digital image, such as text that may include a component identifier (e.g., model number, name, characteristics, dimensions, etc.). Based on the identified text, the computing device may recognize representations of one or more physical components in the schematic and link the representations to data stored in the database that is associated with the recognized physical components.

In some embodiments, the computing device may modify the original digital image (or generate a mapping of the digital image) such that it becomes interactive and visible in a user interface in a manner that allows the user to select a physical component and view data that has been linked to the selected physical component. For example, in a schematic of a system (e.g., a manufacturing facility's automated fabrication process, which may include thousands of different physical components that provide dynamic data, such as sensor data) the digital image may be interactive such that the user can select a particular component (e.g., a particular sensor) in order to initiate automatic retrieval of various data regarding the sensor, such as information regarding the particular physical sensor component (e.g., specification data of the sensor that has been linked to the particular physical sensor component using the processes discussed herein), characteristics of the physical components, limits or alarms associated with the physical component, graphs that depict sensor data associated with the physical component, graphs that depicts a relationship between the physical component and other physical components that are located nearby current, historical output data of the particular physical sensor component, and/or other information related to the selected physical sensor component. For example, sensor data measurements may be provided in one or more graphs that are each associated with a selected physical component and, in some embodiments, multiple graphs (or other visualizations) of sensor data measurements from multiple different physical components may be concurrently displayed in an interactive user interface. In one embodiment, the graphs may be linked such that manipulating one graph (e.g., zooming in or out, adjusting the time range, etc.) causes an identical or nearly identical manipulation in other graphs that are visible. The graphs may be displayed and/or manipulated in any manner, such as by the techniques disclosed in U.S. Application No. 62/059,601, filed Oct. 3, 2014 and titled "CHRONICLE TIME-SERIES ANALYSIS SYSTEM, which is hereby incorporated by reference in its entirety.

One aspect of the disclosure provides a computing system configured to access one or more databases in substantially real-time to identify and link data associated with particular physical components with representations of the particular physical components illustrated in a schematic layout of the physical components in an interactive user interface. The computing system comprises a computer processor. The computing system further comprises one or more parts databases storing entries that each include an identity of a physical component and data associated with the respective physical component. The computing system further comprises a computer readable storage medium storing program instructions configured for execution by the computer processor in order to cause the computing system to access a digital image, where the digital image includes a schematic layout of a plurality of physical components; parse the image to identify first text in the image; compare the first text with identities of physical components that are included in the entries stored in the one or more parts databases; identify a first identity stored in the one or more parts databases that matches the first text; retrieve, from the one or more parts databases, data associated with a first physical component identified by the first identity in the one or more parts databases; determine an area covered by the first physical component in the digital image; create a link in a linkage database between the data associated with the first physical component and one or more of the first text in the digital image or the area in the digital image covered by the first physical component; and generate user interface data such that the interactive user interface includes the digital image and a link at one or more of a location of the first text in the digital image or the area covered by the first physical component, where the link, when selected, causes the interactive user interface to display the data associated with the first physical component.

The computing system of the preceding paragraph can include any sub-combination of the following features: where the computer readable storage medium further stores program instructions that cause the computing system to associate, in the linkage database, one or more data series associated with the first physical component, the one or more data series including historical data regarding input values, and output values associated with the first physical component; where the data associated with the first physical component comprises sensor data measured by the first physical component; where the data associated with the first physical component comprises a graph depicting a relationship between the first physical component and other physical components illustrated in the schematic layout; where the computer readable storage medium further stores program instructions that cause the computing system to, in response to a selection of a second physical component in the graph, update the user interface data such that the interactive user interface displays data associated with the second physical component; where the computer readable storage medium further stores program instructions that cause the computing system to, in response to a selection of the first physical component in the interactive user interface, update the user interface data such that the interactive user interface includes a window, where the window includes sensor data measured by the first physical component; where the computer readable storage medium further stores program instructions that cause the computing system to, in response to a selection of a second physical component in the interactive user interface, update the user interface data such that the interactive user interface includes a second window, where the second window includes sensor data measured by the second physical component; where the computer readable storage medium further stores program instructions that cause the computing system to, in response to a selection of first sensor data measured by the first physical component corresponding to a first time, update the user interface data such that the interactive user interface includes a marker in the second window at a location of second sensor data measured by the second physical component that corresponds with the first time; where the computer readable storage medium further stores program instructions that cause the computing system to, in response to a command to zoom in on the window to a first zoom level corresponding to a first data range along a y-axis, update the user interface data such that the interactive user interface zooms in on the second window to the first zoom level so that the sensor data measured by the first physical component is displayed for the first data range along the y-axis and the sensor data measured by the second physical component is displayed for the first data range along the y-axis; where the first user interface includes an index window that lists identities for each of the plurality of physical components illustrated in the schematic layout, and where the computer readable storage medium further stores program instructions that cause the computing system to, in response to a selection of an identity of the first physical component, update the user interface data to adjust a location of the digital image in the interactive user interface such that a representation of the first physical component in the schematic layout is centered in the interactive user interface; where the first user interface includes a notes window that identifies previous changes to the schematic layout, and where the computer readable storage medium further stores program instructions that cause the computing system to, in response to a selection of a first note listed in the notes window, update the user interface data such that the interactive user interface identifies a second physical component illustrated in the schematic layout that is associated with the first note; where the computer readable storage medium further stores program instructions that cause the computing system to, in response to a selection of the first physical component in the interactive user interface, update the user interface data such that the interactive user interface displays a note associated with the first physical component; where the computer readable storage medium further stores program instructions that cause the computing system to, in response to a request to animate a flow of data through one or more of the physical components in the plurality of physical components, update the user interface data such that the interactive user interface includes an animation that indicates a sensor value as oil passes through the first physical component at a first time and the sensor value as the oil passes through a second physical component at a second time after the first time; where the computer readable storage medium further stores program instructions that cause the computing system to, in response to an input providing model sensor data for the first physical component, update the user interface data such that the interactive user interface includes a prediction of a sensor value for a second physical component that is coupled to the first physical component; and where the first physical component is an injector on an oil platform.

Another aspect of the disclosure provides a computer-implemented method of accessing one or more databases in substantially real-time to identify and link data associated with particular physical components with representations of the particular physical components illustrated in a schematic layout of the physical components in an interactive user interface. The computer-implemented method comprises accessing a digital image, wherein the digital image includes a schematic layout of a plurality of physical components. The computer-implemented method further comprises parsing the image to identify first text in the image. The computer-implemented method further comprises comparing the first text with identities of physical components that are included in the entries stored in a parts database. The computer-implemented method further comprises identifying a first identity stored in the parts database that matches the first text. The computer-implemented method further comprises retrieving, from the parts database, data associated with a first physical component identified by the first identity in the parts database. The computer-implemented method further comprises determining an area covered by the first physical component in the digital image. The computer-implemented method further comprises creating a link in the parts database between the data associated with the first physical component and one or more of the first text in the digital image or the area in the digital image covered by the first physical component. The computer-implemented method further comprises generating user interface data such that the interactive user interface includes the digital image and a link at one or more of a location of the first text in the digital image or the area covered by the first physical component, where the link, when selected, causes the interactive user interface to display the data associated with the first physical component.

The computer-implemented method of the preceding paragraph can include any sub-combination of the following features: where the data associated with the first physical component comprises sensor data measured by the first physical component and a graph depicting a relationship between the first physical component and other physical components illustrated in the schematic layout; where the method further comprises updating, in response to a selection of a second physical component in the graph, the user interface data such that the interactive user interface displays data associated with the second physical component; where the method further comprises updating, in response to a selection of the first physical component in the interactive user interface, the user interface data such that the interactive user interface includes a window, where the window includes sensor data measured by the first physical component; where the computer readable storage medium further stores program instructions that cause the computing system to, in response to a selection of a second physical component in the interactive user interface, update the user interface data such that the interactive user interface includes a second window, where the second window includes sensor data measured by the second physical component; and where the method further comprises updating, in response to a selection of first sensor data measured by the first physical component corresponding to a first time, the user interface data such that the interactive user interface includes a marker in the second window at a location of second sensor data measured by the second physical component that corresponds with the first time.

BRIEF DESCRIPTION OF THE DRAWINGS

FIGS. 4A-F illustrate user interfaces displaying a relationship between two selected physical components in the schematic layout depicted in the digital image.

DETAILED DESCRIPTION OF SPECIFIC EMBODIMENTS

Overview

As described above, it can become very difficult for the user to identify relevant data and perform an analysis for a system including thousands, millions, or more different components that interact with one another in various manners, especially when data regarding the physical components may be stored in multiple external databases. In some cases, the user may want to analyze data stored in one or more databases in conjunction with the layout of physical components. For example, the user may view a digital image in a user interface that includes a schematic of various physical components. The schematic may represent an actual device or structure, such as the example manufacturing facility schematics discussed above, a schematic of an electronic circuit, an oil well platform, or any other system including multiple physical components, and may depict relationships between the various physical components. The user may wish to view data measured by or associated with one or more of the physical components; however, there may be no linkage between the schematic and the various data regarding the physical components and one or more databases that include relevant data regarding the physical components. For example, different external or internal data sources may store different types of sensor measurements associated with the physical components. Other external or internal data sources may store various schematics and still other external or internal data sources may store information related to the physical components (e.g., model number, name, characteristics, dimensions, etc.). The schematic may not be interactive or provide any way for the user to selectively view data stored in one or more internal and/or external data sources that has been associated with physical components in the schematic by way of the process described herein, such as with reference to FIG. 8, while also viewing the schematic. Advantageously, this would allow the user, even an unskilled user, to easily view various types of data regarding components of interest while also viewing the physical location of the components with reference to one another on the schematic. Furthermore, this would advantageously reduce the need for the user to open a new window or separately access data sources to find the specific data associated with physical components of interest.

Figure 9:
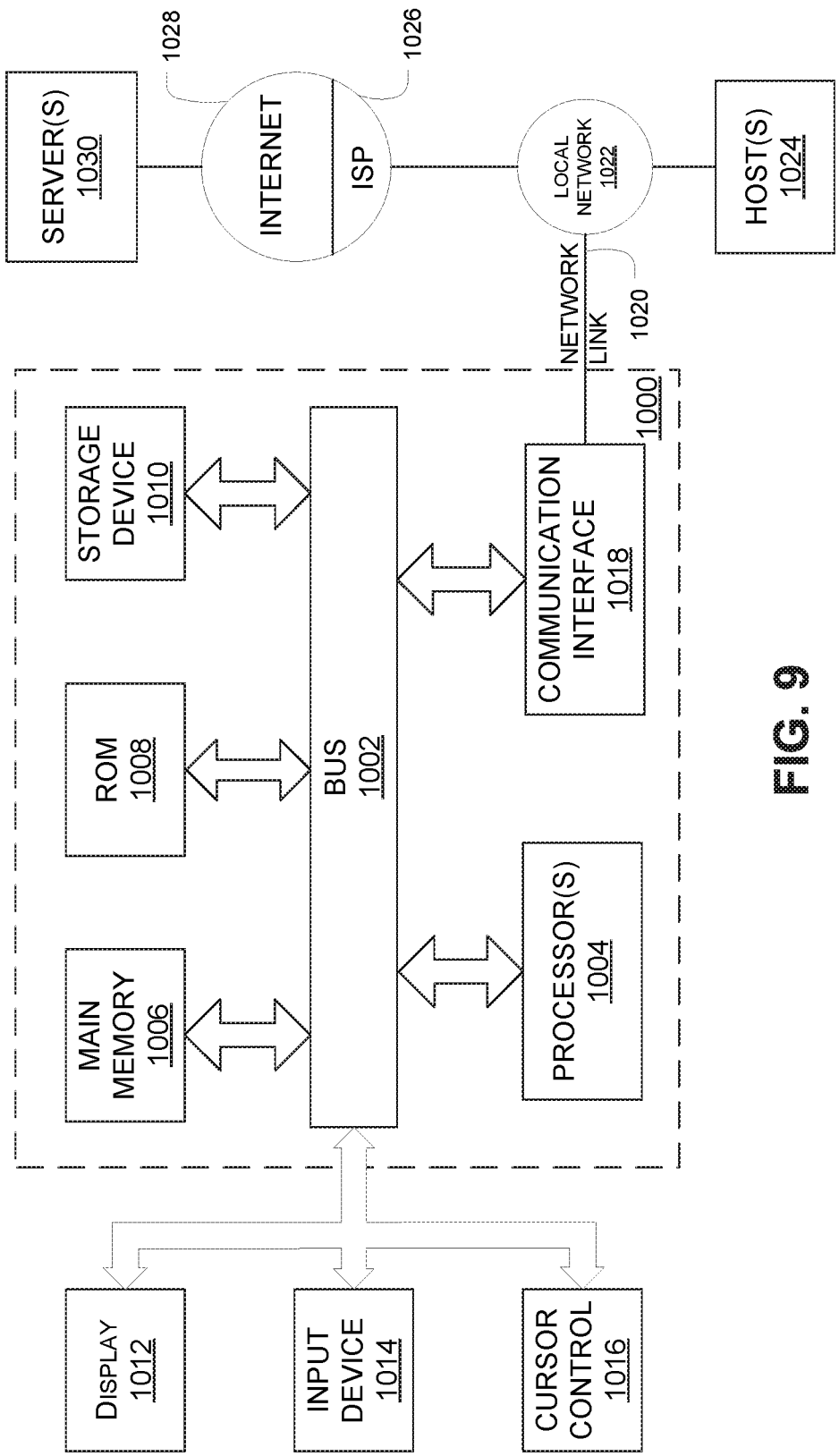
FIG. 9 illustrates a computer system with which certain methods discussed herein may be implemented, according to one embodiment.

Accordingly, disclosed herein are various systems and methods for displaying schematics (or other visual representations of multi-component systems) and data associated with the various physical components in the schematics in an interactive user interface. For example, a computing device (e.g., the computing system 1000 of FIG. 9 described below) may be configured to link data stored in one or more databases with particular portions of schematics that can be displayed in one or more interactive user interfaces. The computing device may parse a digital image that depicts a schematic and identify text visible in the digital image, such as text that may include a component identifier (e.g., model number, name, characteristics, dimensions, etc.). Based on the identified text, the computing device may recognize representations of one or more physical components in the schematic and link the representations (or specific locations of the schematic in which the physical component is located) to various data associated with the physical components, which may be stored in one or more databases. In the embodiment of FIG. 9, the computing system 1000 may store (or have access to) a linkage database that stores associations between physical components in a schematic and the various information regarding the physical components that may be copied to the linkage database itself and/or includes in the linkage database with a reference to another one or more data sources.

In some embodiments, the computing device may modify the original digital image such that it becomes interactive and visible in a user interface in a manner that allows the user to select a physical component and view data associated with the selected physical component, such as data that is associated with the physical component in the linkage database and/or that is in external data sources at specific locations identified in the linkage database. For example, the digital image may be interactive such that the user can view sensor data measurements in one or more graphs that are each associated with a different physical component. The graphs may be linked such that manipulating one graph (e.g., zooming in or out, adjusting the time range, etc.) causes an identical or nearly identical manipulation in other graphs that are visible. As another example, the digital image may be interactive such that the user can select a physical component in the user interface, which causes the user interface to display information related to the physical component, such as an identification of the physical components, characteristics of the physical components, limits or alarms associated with the physical component, graphs that depict sensor data associated with the physical component, and/or graphs that depicts a relationship between the physical component and other physical components that are located nearby.

A schematic can be one of many schematics that are associated with each other. Thus, the interactive digital image depicting one schematic can include one or more links or references to other interactive digital images that depict the other associated schematics. When a user selects a link or reference to another interactive digital image, the linked or referenced interactive digital image may be opened and displayed in the user interface (e.g., in the same window as the interactive digital image the user was initially viewing or in a separate window).

The systems and methods described herein may provide several benefits. For example, the systems and methods described herein may improve the usability of the user interface by providing graphs overlaying a digital image depicting a schematic that can be manipulated by a user in a concurrent manner, thereby allowing the user to identify trends or other information associated with the physical components included in the schematic without having to separately manipulate each individual graph. As another example, the systems and methods described herein may reduce the processor load by linking data associated with the physical components with the graphical representation of the physical components in the digital image. Because the system compiles data and/or references to data associated with components in a linkage database, such data can be automatically and quickly (e.g., in real-time) accessed by the system and displayed to the user. Rather than requiring the user to manually access multiple data sources, possibly in multiple different software applications (e.g., a browser, proprietary parts information application, etc.) in multiple windows, while trying to match up the various data regarding physical components associated with the schematic in another window (e.g., an image viewer), the user can view all relevant information from the multiple data sources automatically and overlaid (or otherwise integrated with) the schematic and displayed within one window. As another example, the systems and methods described herein may reduce the latency experienced by the user in identifying relevant data associated with one or more physical components of a system by parsing the digital image and linking the relevant data stored in the linkage database with the identified physical components before the digital image is presented to the user. Additionally, the systems and methods discussed herein advantageously allow the user to view sensor output data, and even graphs of historical sensor data, for each of multiple sensors of a system, concurrently within a single user interface and with interactivity between the graphs of historical sensor data. Accordingly, these systems and methods may allow the user to identify correlations between sensors that may not be possible to identify using existing data analysis systems.

Figure 1A:
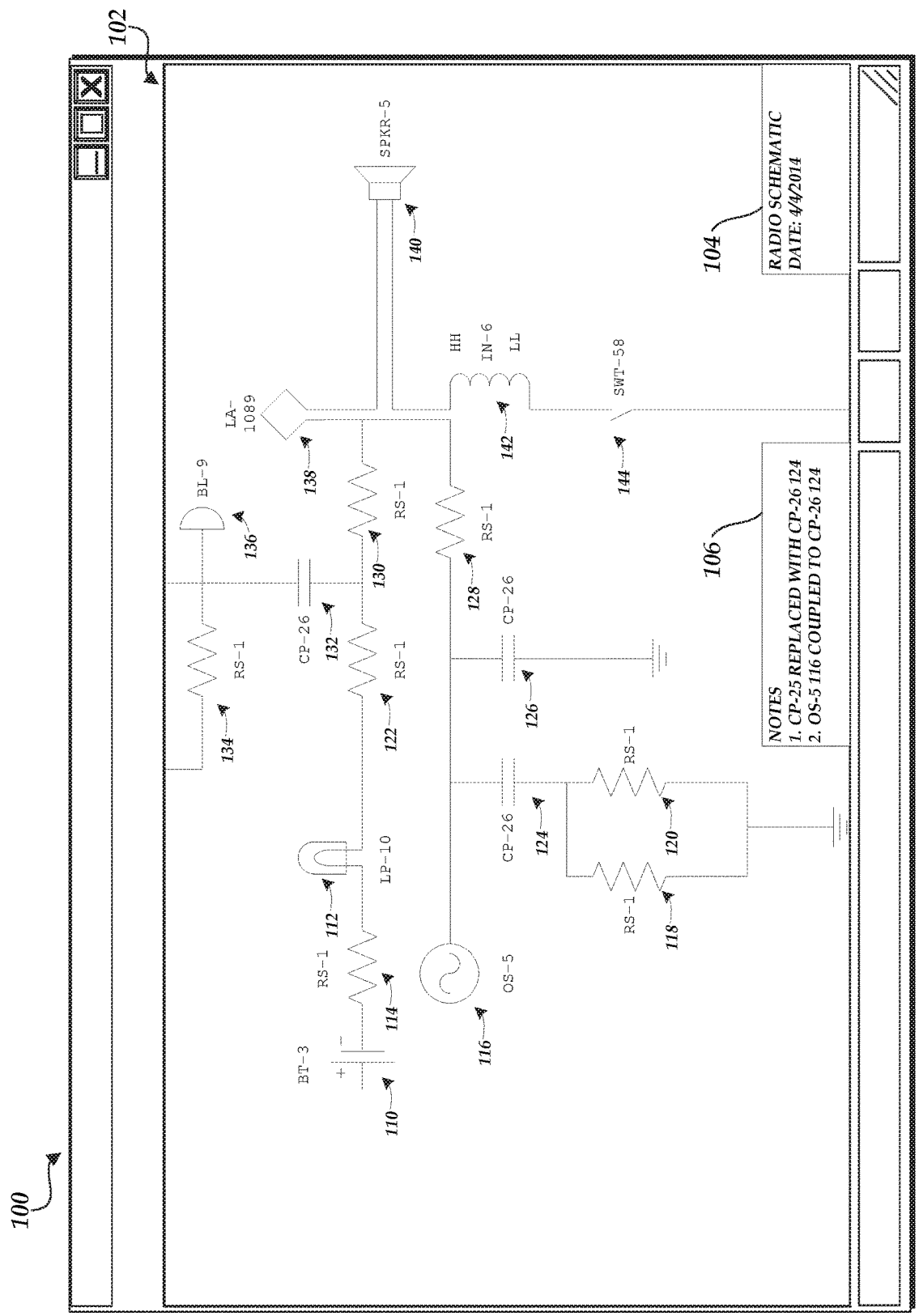
FIG. 1A illustrates a user interface that displays an unparsed digital image that depicts a schematic layout of various physical components.

Example Parsing and Manipulation of a Digital Image in an Interactive User Interface FIG. 1A illustrates a user interface 100 that displays an unparsed digital image 102 that depicts a schematic layout of various physical components. In this example, the physical components include a battery 110, a lamp 112, a resistor 114, an oscillator 116, a resistor 118, a resistor 120, a resistor 122, a capacitor 124, a capacitor 126, a resistor 128, a resistor 130, a capacitor 132, a resistor 134, a bell 136, a loop antenna 138, a speaker 140, an inductor 142, and a switch 144. While FIG. 1A depicts electrical physical components, this is not meant to be limiting. The embodiments described herein may relate to any type of physical component, such as mechanical components, devices present on an oil well platform, etc.

In an embodiment, the digital image 102 further includes a title box 104 that identifies the structure made up of the displayed physical components and a notes box 106 that identifies changes that have been made to the schematic over time. As illustrated in FIG. 1A, the digital image 102 may be a static image that has not been parsed. Thus, the user interface 100, at the portion that displays the digital image 102, may not be interactive. In some embodiments, the digital image is a scan of a physical printout or drawing of a schematic, such as may be generated with a scanner, camera, or other imaging equipment. In other embodiments, the digital image 102 is a computer aided design (CAD) image in one of various available file formats, or an image file generated from the CAD image, or any other digital format.

Figure 1B:
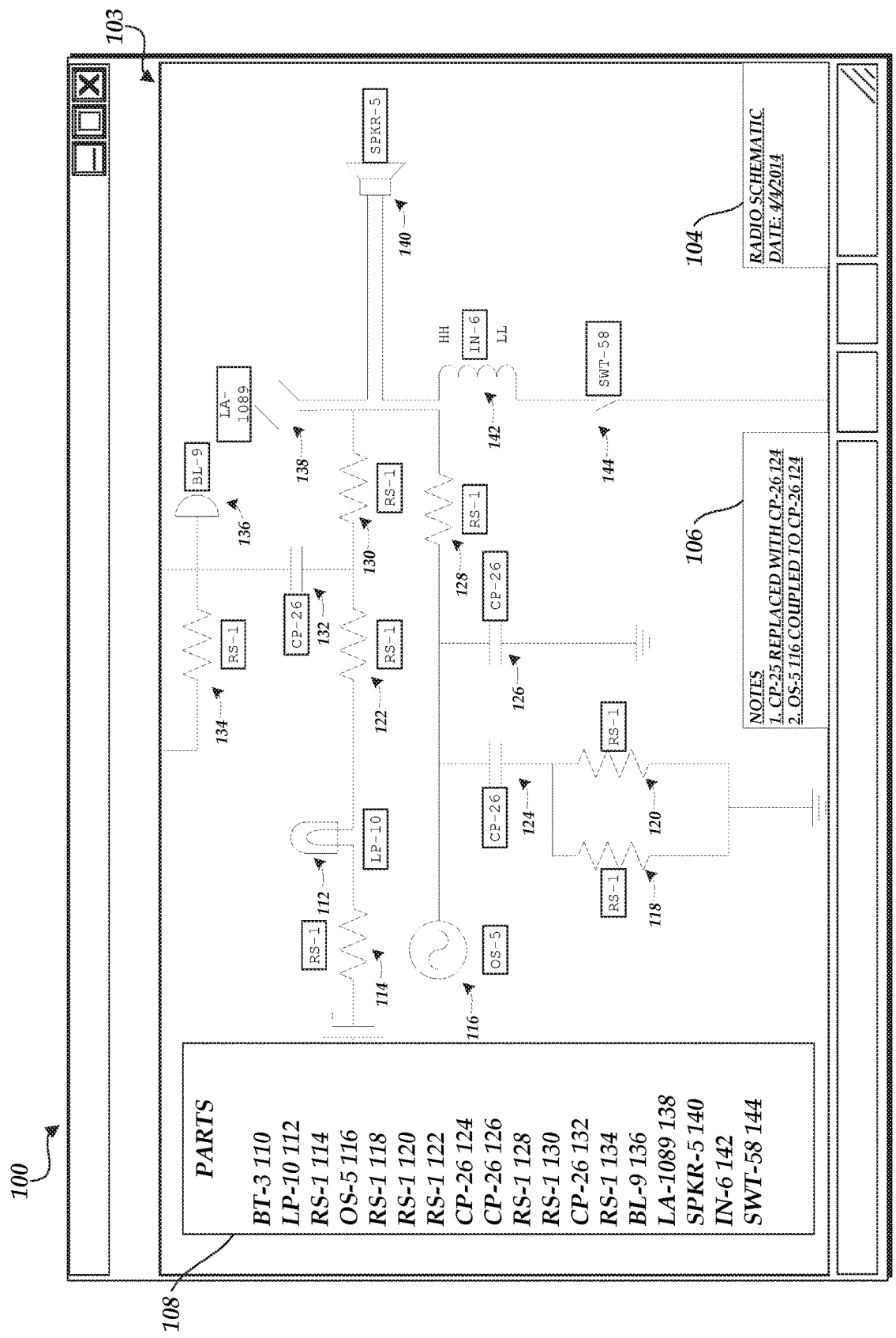
FIG. 1B illustrates a user interface that displays a parsed digital image that depicts a schematic layout of various physical components.

FIG. 1B illustrates the user interface 100 with a parsed digital image 103 that depicts a schematic layout of the various physical components included in the schematic that are have now been modified to become interactive. For example, the computing system 1000 may parse the digital image 102 and identify text, such as the outlines, shapes, colors, etc. of identified physical components, names or other textual (e.g., alphanumeric part numbers) information identifying the physical components, the text in the title box 104, and/or the text in the notes box 106. A database, for example, may be queried to determine whether any of the identified text corresponds to an identity of physical components found in entries of the database and/or to data stored in the database. If the query yields a match or close match (e.g., the text and an identity of the physical component match within a few letters), then the data associated with the identity of the physical component may be linked with the identified text. A separate page, not immediately visible to the user in the user interface 100, may be generated that includes some or all of the associated data and may be accessible upon a selection of a representation of a physical component in the digital image 103, as described in greater detail below. In a similar manner, shapes, colors, patterns, etc. of components may be detected and compared to those same types of features associated with known physical components (e.g., in manufacture specification manuals) in order to more positively identify a particular physical component. In some embodiments, information from multiple data sources may be used in order to identify (e.g., to a required confidence level) a particular physical component. For example, if text associated with a physical component is parsed and found to be associated with six different physical components, while the shape, size, outline, and/or other physical characteristics of the physical component are matched up with three possible physical components, an overlapping single physical component in each matched set may be determined to be the actual physical component in the schematic.

In an embodiment, once the text is identified, the text or a location near a physical component that corresponds with the text may be replaced with a link, or a link layer including the link may be overlaid on the schematic image, or some other software that tracks locations of user selections on the schematic may be used to determine a location of the user selection and initiate access of information regarding any physical components at that selected schematic location using the linkage database. The link may redirect the user to another page within the user interface 100 that provides additional information on the selected item. The link may also or in the alternative cause the user interface 100 to modify a placement of the digital image 103 (e.g., shift the digital image 103 to the right) or cause another window to appear in the user interface 100 to provide additional information on the selected item. For example, the text associated with the physical components in the schematic may include a link (as evidenced by the boxes surrounding the text associated with the physical components in FIG. 1B), and the text in the title box 104 may include a link and the text in the notes box 106 may include a link (as evidenced by the underlined text in FIG. 1B).

The user interface 100 may further include a parts window 108 that provides an index of physical components that have been identified in the digital image 102. The parts window 108 may overlay the digital image 102 or may be displayed in a separate window (not shown).

Figure 2A:
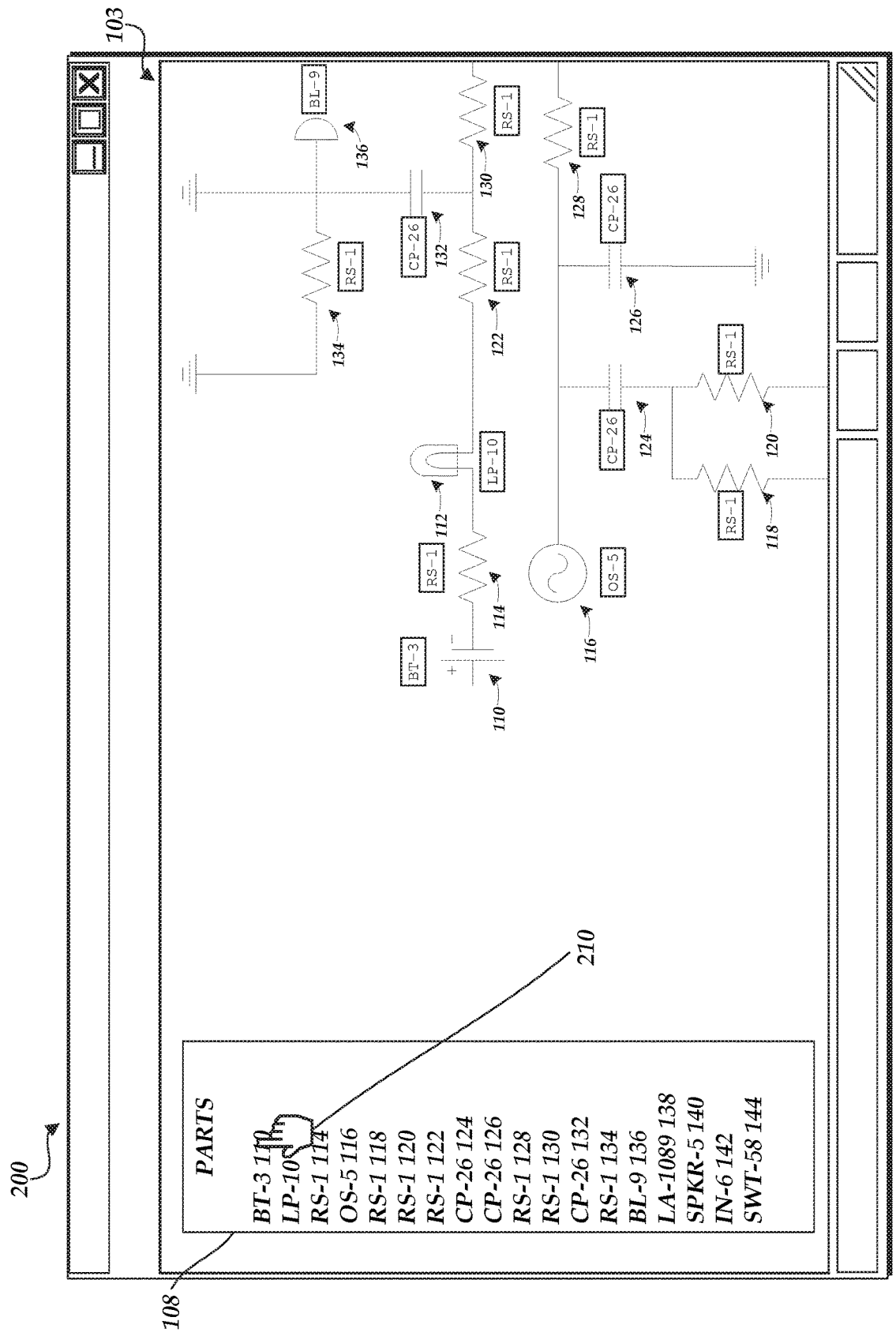
FIGS. 2A-B illustrate user interfaces displaying the centering of physical components when selected in an index provided by the parts window.
Figure 2B:
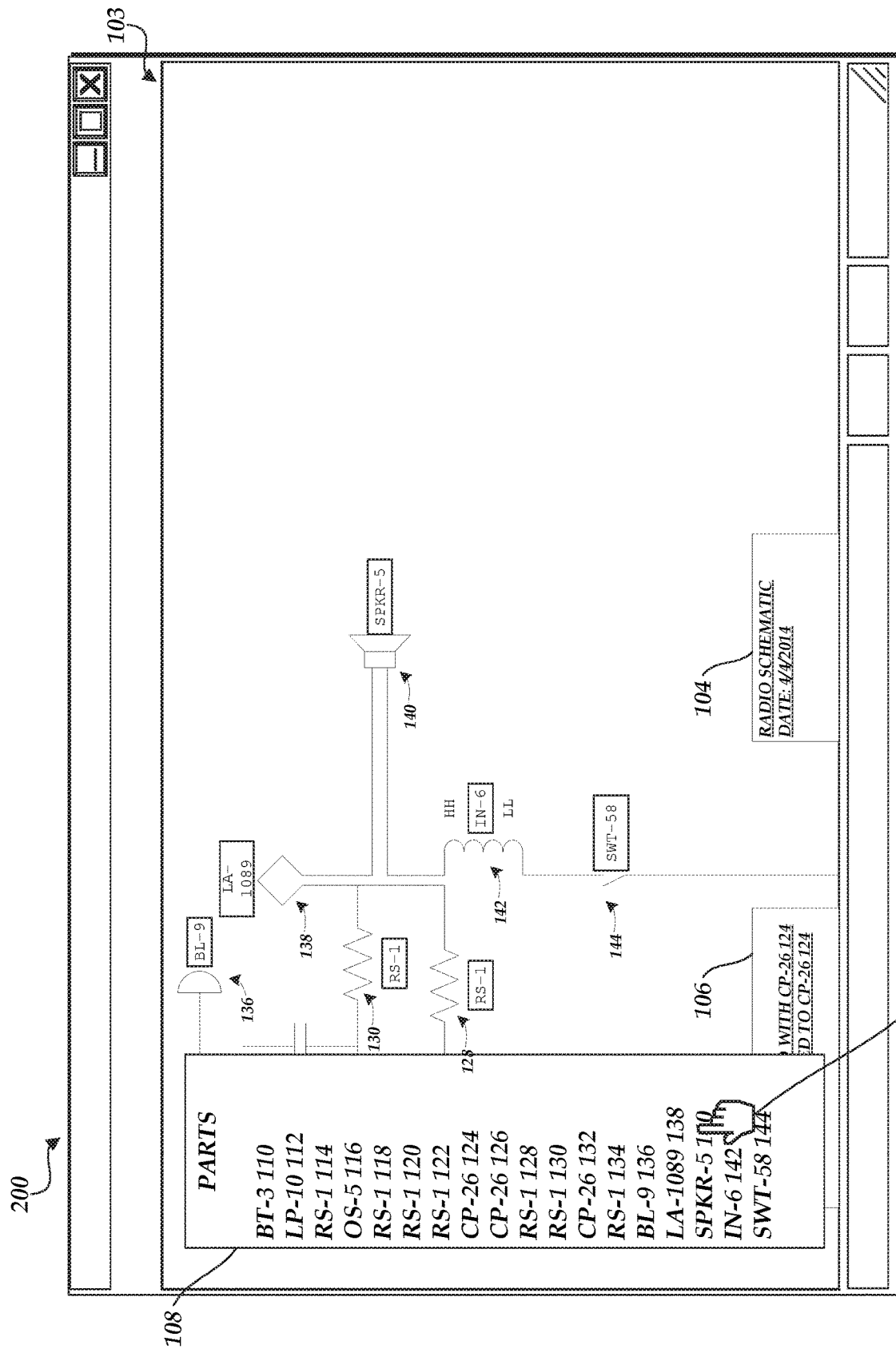

The parts window 108 may be interactive such that the user can select a physical component from the index and be presented with a location of the physical component in the digital image 103. For example, FIGS. 2A-B illustrate user interfaces 200 displaying the centering of physical components when selected in an index provided by the parts window 108. As illustrated in FIG. 2A, the user selects battery 110 in the index via a cursor 210. Selection may include clicking on the text in the index, hovering over the text in the index, providing a voice or key command as the cursor 210 is placed over the text in the index, and/or the like. Upon the selection of the battery 110 in the index, the user interface 200 adjusts the location of the digital image 103 such that the representation of the battery 110 in the schematic is centered. Likewise, upon the selection of the speaker 140 in the index, as illustrated in FIG. 2B, the user interface 200 adjusts the location of the digital image 103 such that the representation of the speaker 140 in the schematic is centered. In some embodiments, selection of a component may be indicated in the schematic using other visual distinctions, such as highlighting the part and/or part identifier or causing them to blink.

Figure 3:
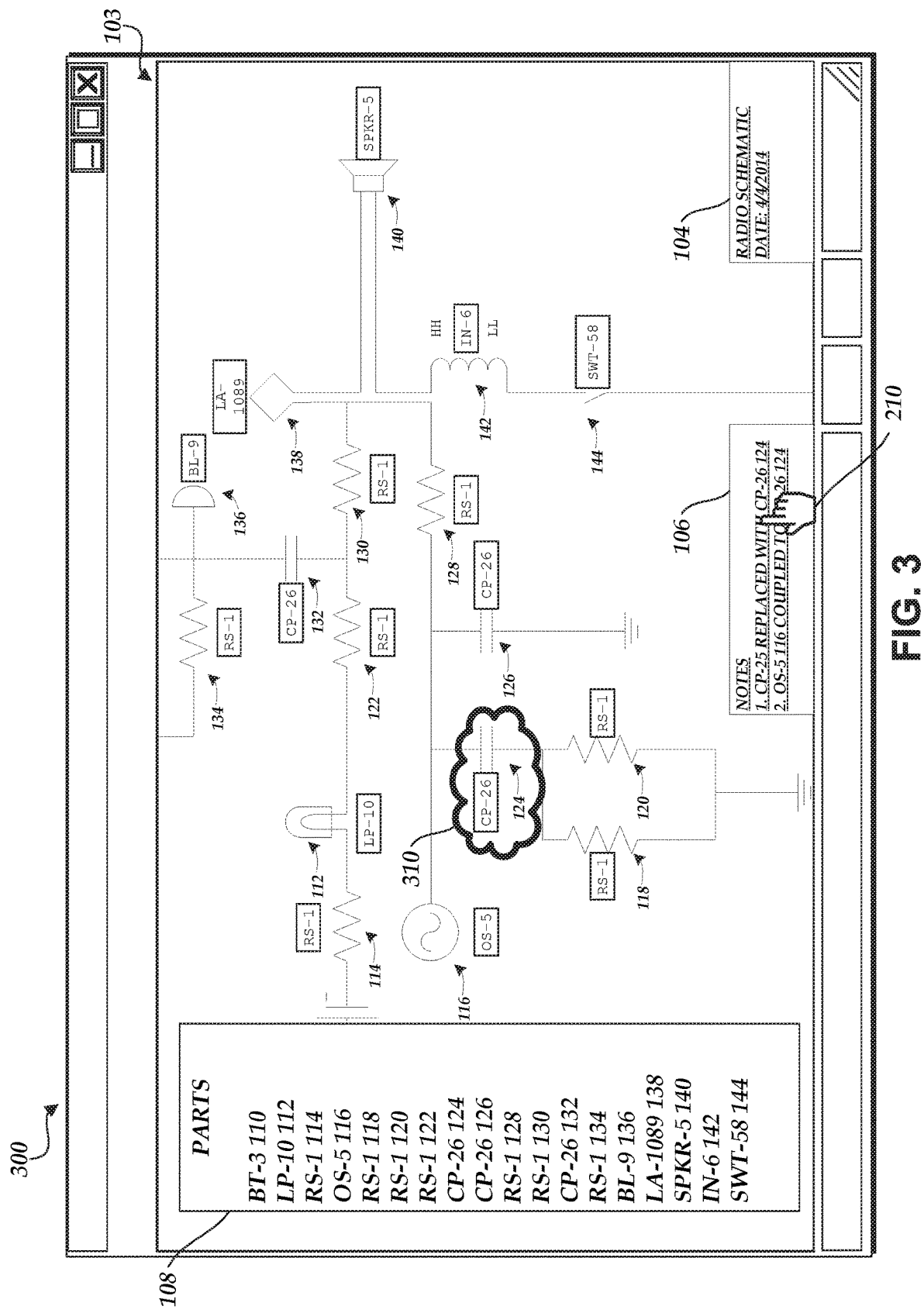
FIG. 3 illustrates a user interface displaying the indication of a physical component associated with a selected note in a change log provided by the notes window.

FIG. 3 illustrates a user interface 300 displaying the indication of a physical component associated with a selected note in a change log provided by the notes window 106. For example, the schematic illustrated in the digital image 103 may have been modified at previous times, and the notes window 106 may provide notes that indicate what physical components were changed and/or how the schematic was modified.

As illustrated in FIG. 3, the user may select a first note in the notes window 106 via the cursor 210. The first note may indicate that a capacitor CP-25 was replaced with the capacitor 124. Thus, an icon or marker, such as a bubble 310, may appear in the user interface 300 to highlight the physical component associated with the first note (e.g., the capacitor 124).

Figure 4A:
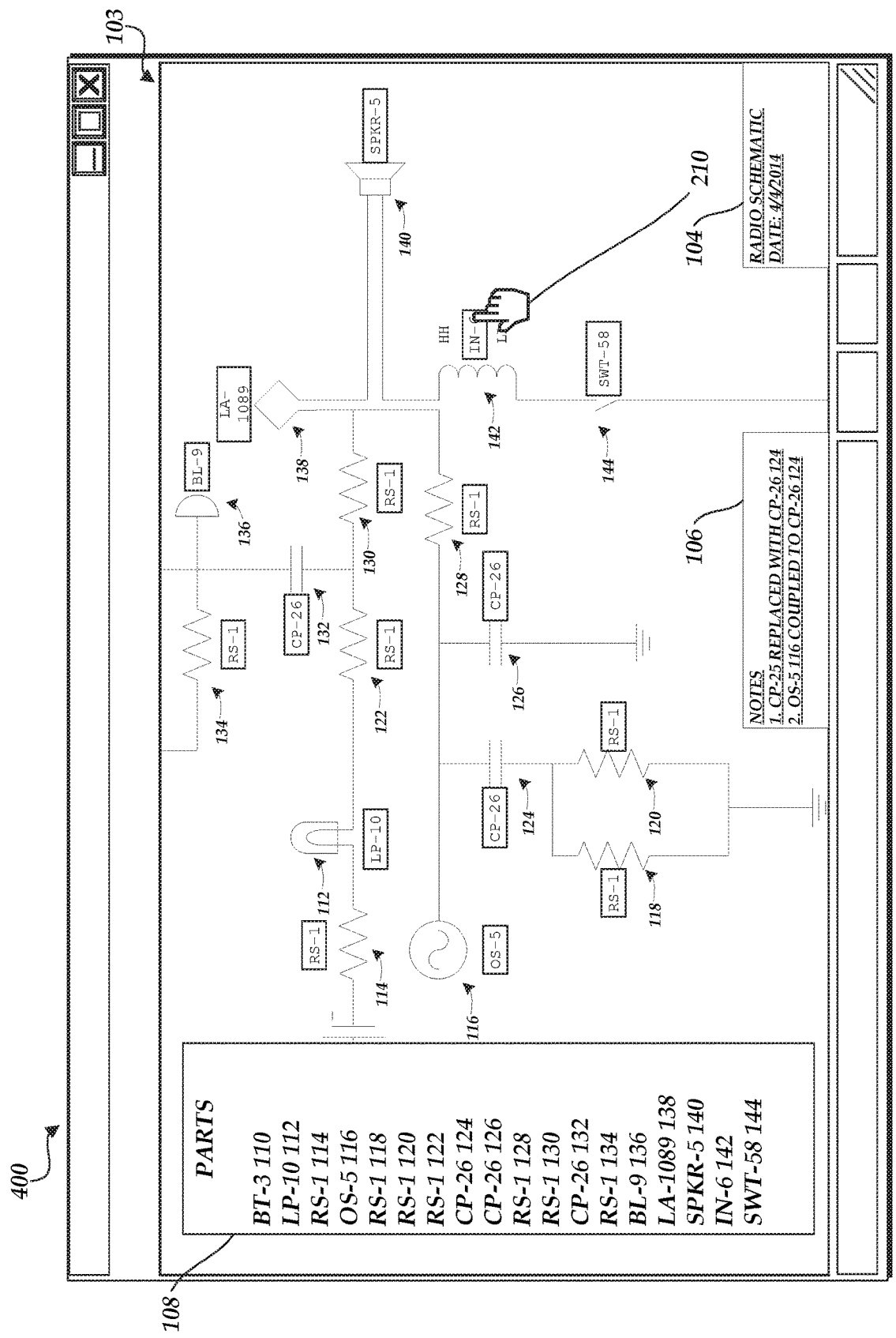

FIGS. 4A-F illustrate user interfaces 400 displaying a relationship between two selected physical components in the schematic layout depicted in the interactive digital image 103. As illustrated in FIG. 4A, the user may select the inductor 142 via the cursor 210.

Figure 4B:
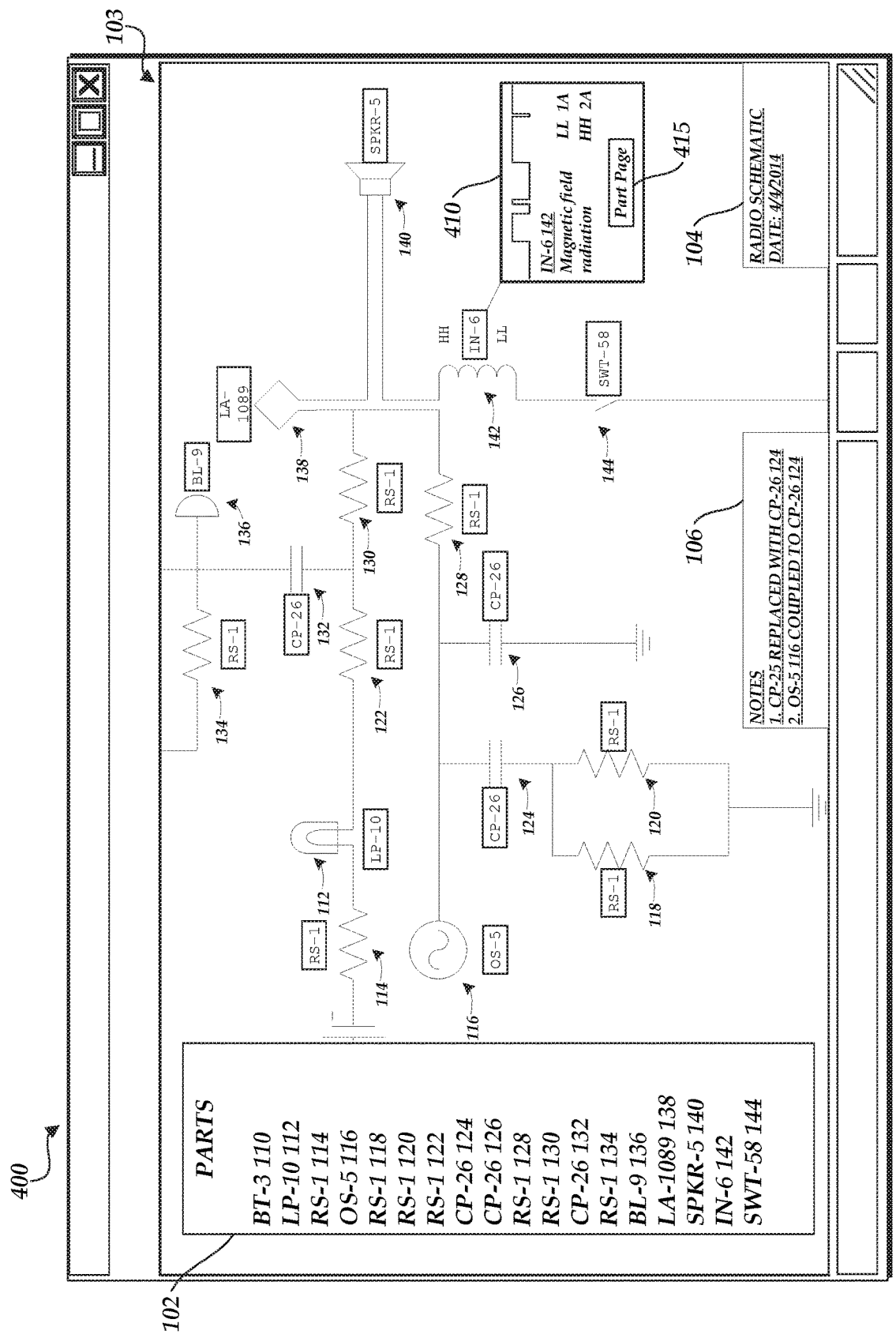

As illustrated in FIG. 4B, selection of the inductor 142 may cause a window 410 to appear in the user interface 400. The window 410 may provide additional information associated with the inductor 142. For example, the window 410 may depict a graph showing measured sensor data associated with the inductor 142 and a description of the type and/or purpose of the inductor 142. The window 410 may also depict an indication of a lower limit (e.g., 1 ampere), represented by "LL" in FIG. 4B and an indication of an upper limit (e.g., 2 amperes), represented by "HH" in FIG. 4B. If the user is viewing historical sensor data in the graph, an alert may be generated when a portion of the historical sensor data illustrated in the graph reaches the lower or upper limit. Likewise, if the user is viewing current (e.g., real-time) sensor data in the graph, an alert may be generated at the time or immediately after the time the measured sensor data reaches the lower or upper limit. The alert may appear in a window overlaying the user interface 400, as a message appearing in the user interface 400, in a separately generated user interface, and/or the like. In addition or in the alternative, the limits and/or other rules associated with a sensor's output (or a combination of sensors outputs) may be applied to real-time data even when a user is not viewing the data, such that alerts may be generated and communicated to the user via an electronic message (e.g., text message, electronic mail, instant message, etc.), which may encourage the user to view the sensor data in the user interface 400 in order to determine if preventative action should be taken (e.g. replacing a failing part). The window 410 may also include a part page button 415 or another control (such as a link) that, when selected, causes the user interface 400 to display a page providing more information about the inductor 142, such as information associated with the particular part number of the inductor 142, which may be included in the linkage database itself or accessible at a location included in the linkage database.

Figure 4C:
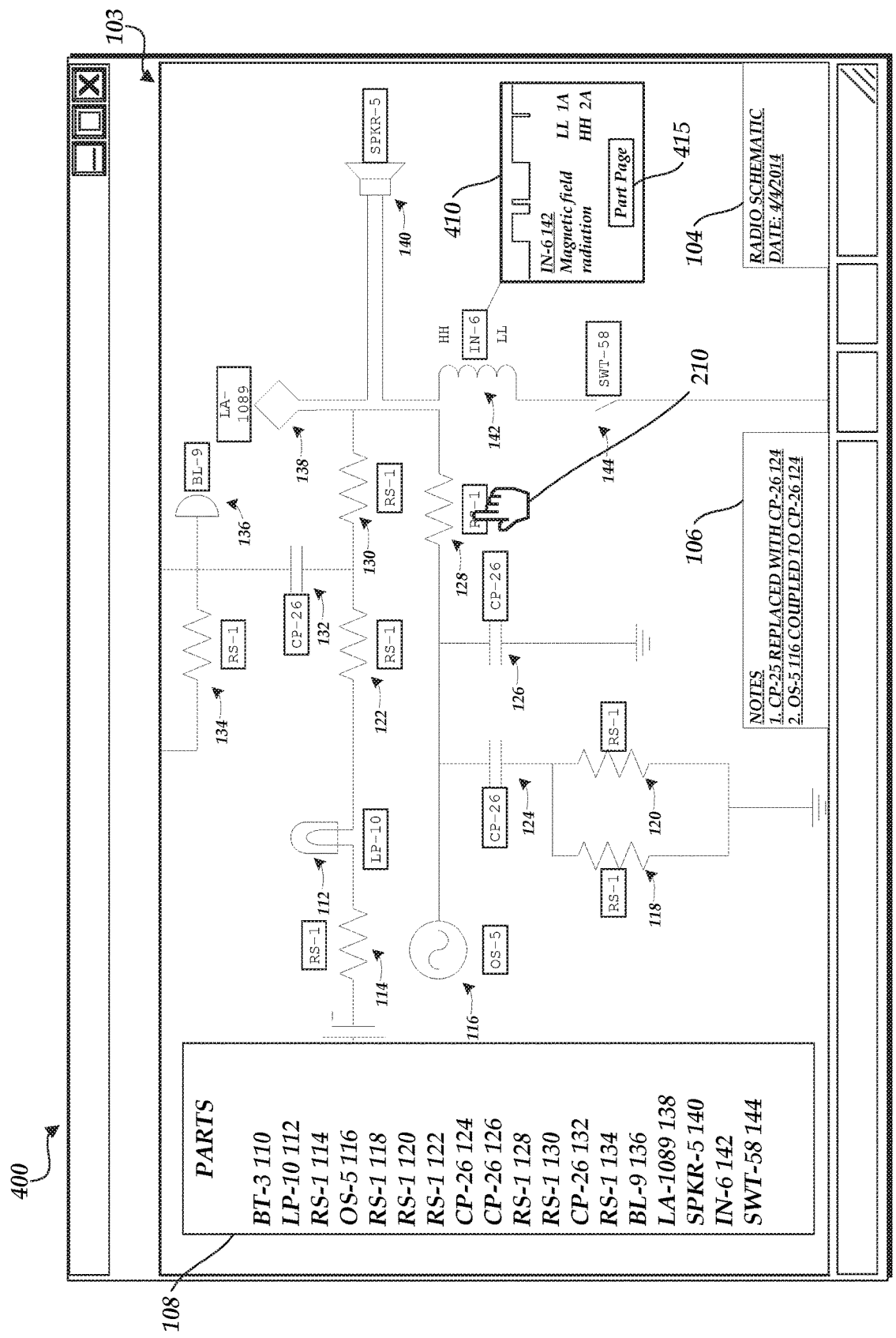
Figure 4D:
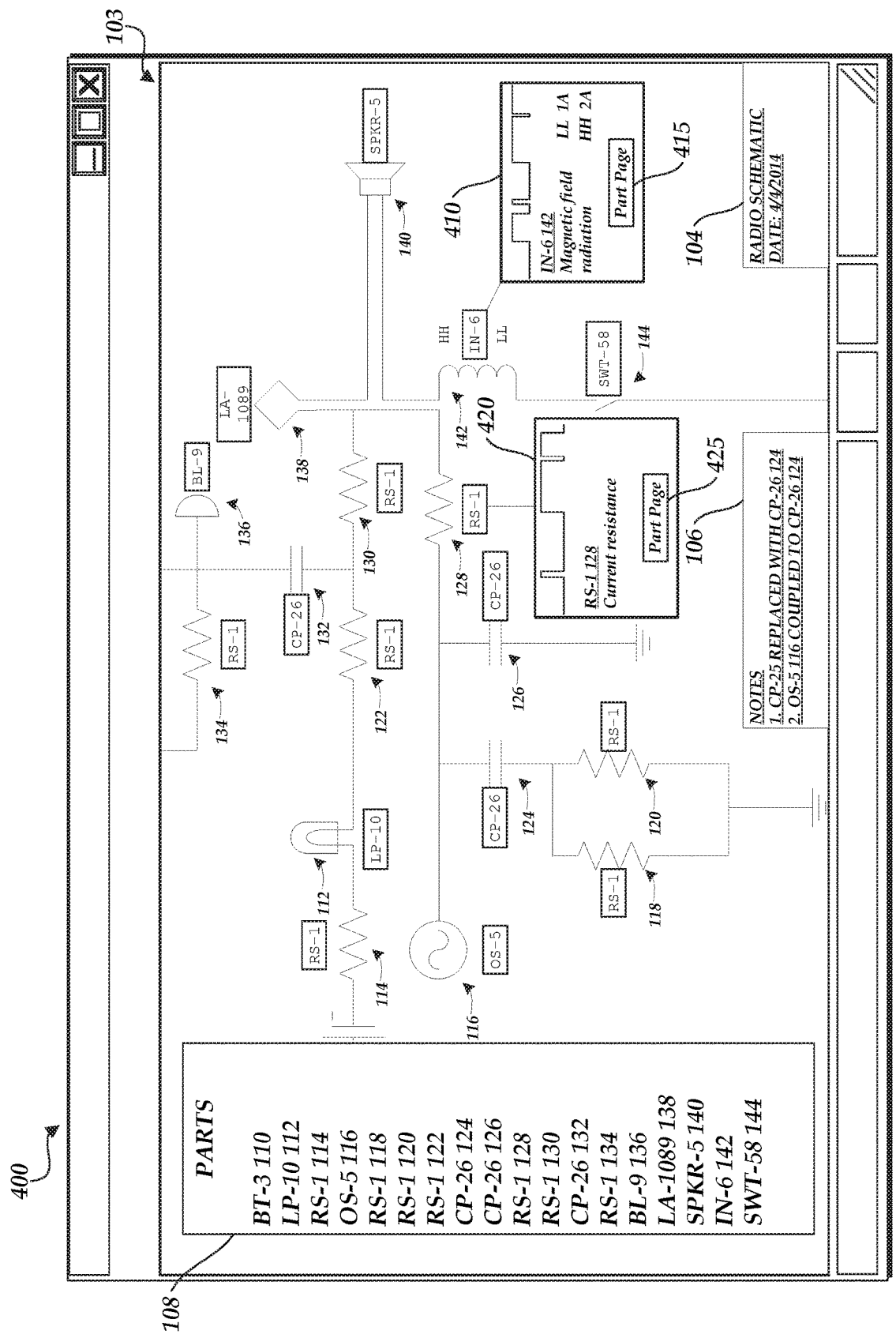

As illustrated in FIG. 4C, the user has selected the resistor 128 via the cursor 210 while the window 410 is still open. As illustrated in FIG. 4D, selection of the resistor 128 may cause another window 420 to appear in the user interface 400. In this example, the window 420 provides additional information associated with the resistor 128, such as the information described above with respect to the inductor 142.

Figure 4E:
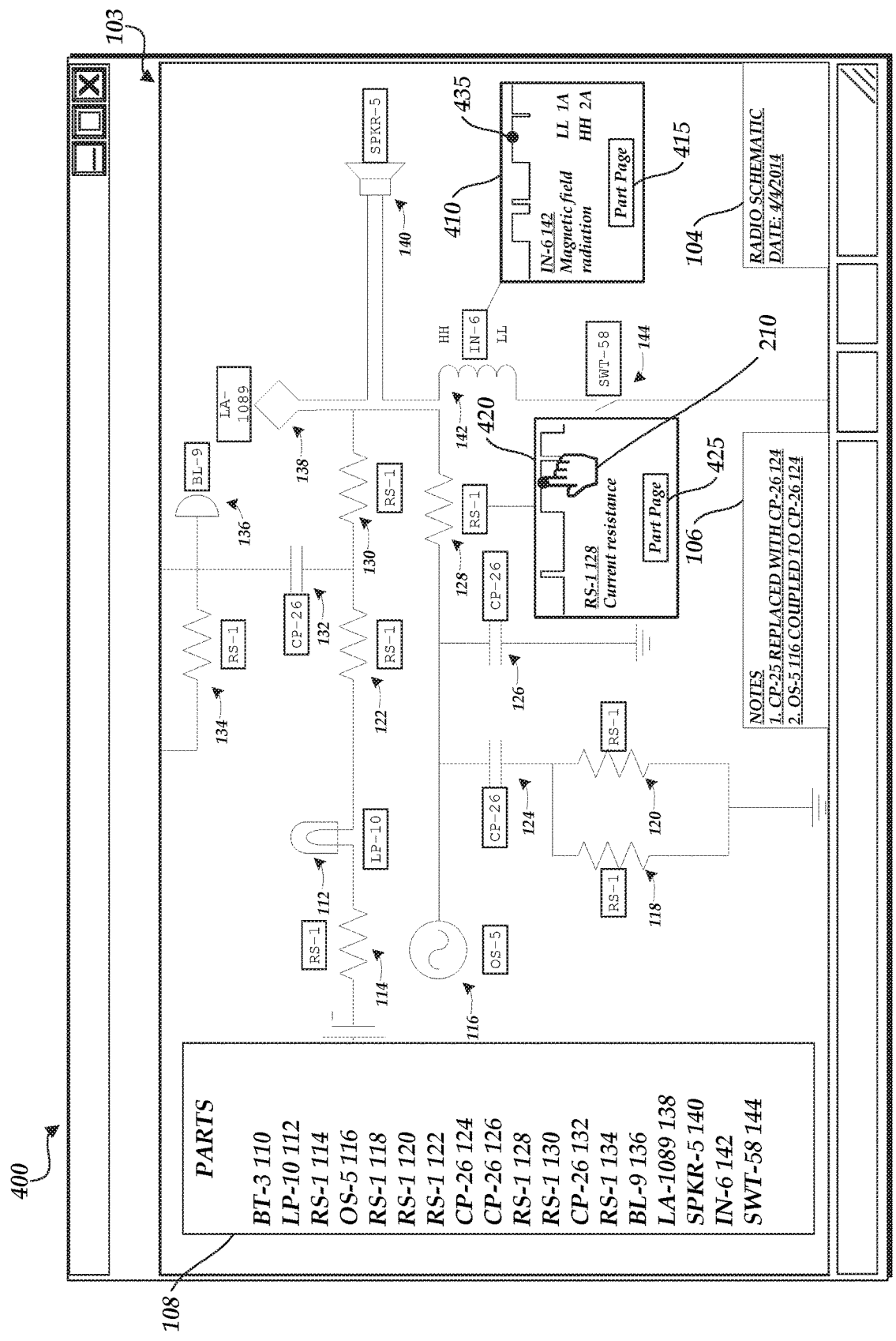

As illustrated in FIG. 4E, the graphs in the windows 410 and 420 may be linked. For example, the user may place the cursor 210 over a portion of the graph in the window 420 that corresponds with a first time, causing a marker 435 to appear in the graph in the window 410 at a location that also corresponds with the first time. Thus, a user can easily identify values of inputs and/or outputs of each of multiple components in a system at a same time or timer period.

Figure 4F:
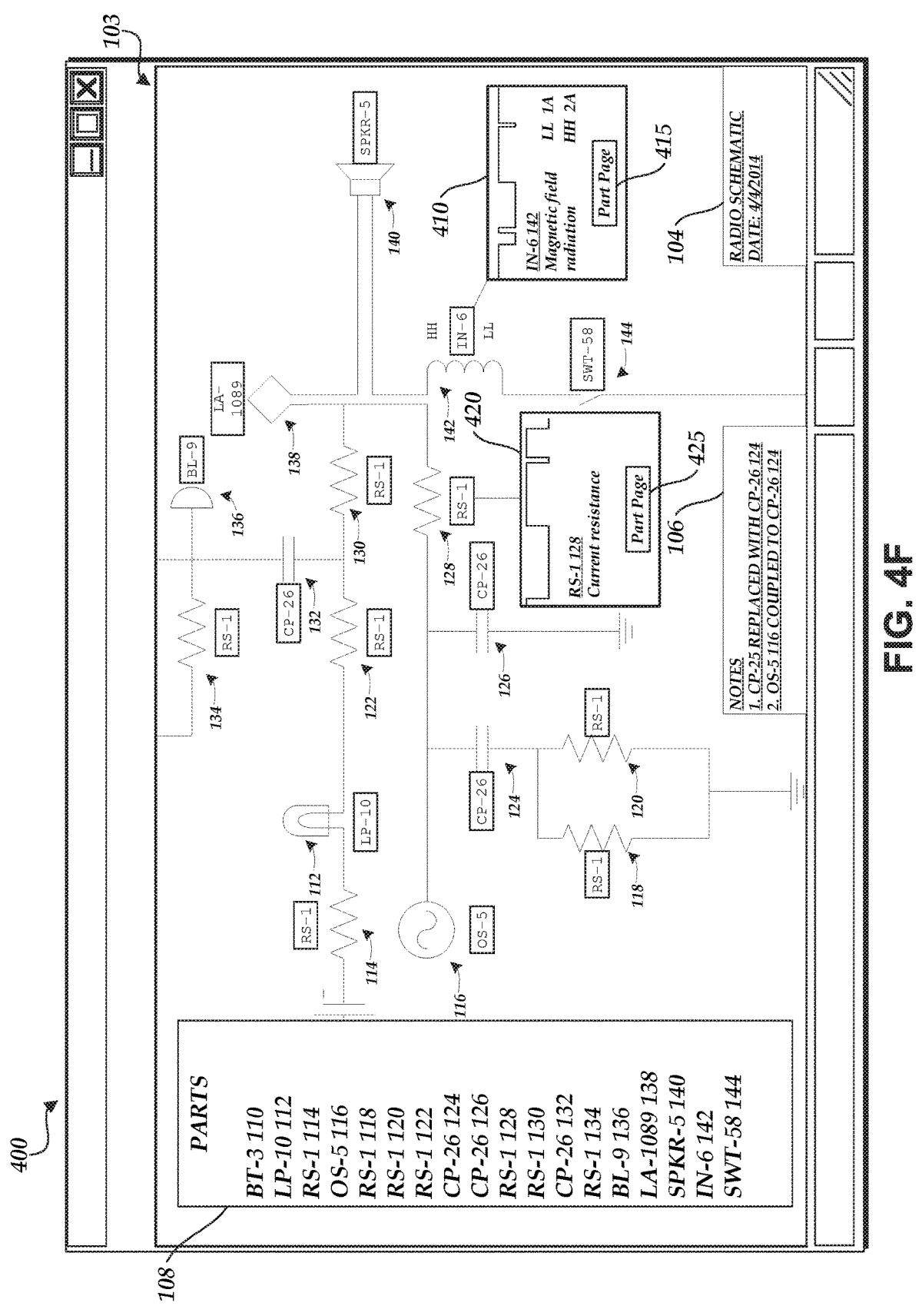

As illustrated in FIG. 4F, the user may manipulate the graph in window, causing an identical or nearly identical manipulation in the graph in another window. For example, the user may zoom in on the graph in the window 420 (e.g., by changing the y-axis in the graph in the window 420 without changing the time range on the x-axis). In response to the zoom command, the graph in the window 410 may zoom in as well (e.g., by changing the y-axis in the graph in the window 410 in the same manner as with the graph in the window 420 without changing the time range on the x-axis). In some embodiments, the graphs in the windows 410 and 420 are manipulated such that they depict the same zoom level (e.g., the user may zoom to a first level in the graph in the window 420, and the graph in the window 410 may be zoomed to the first level as well).

Figure 4G:
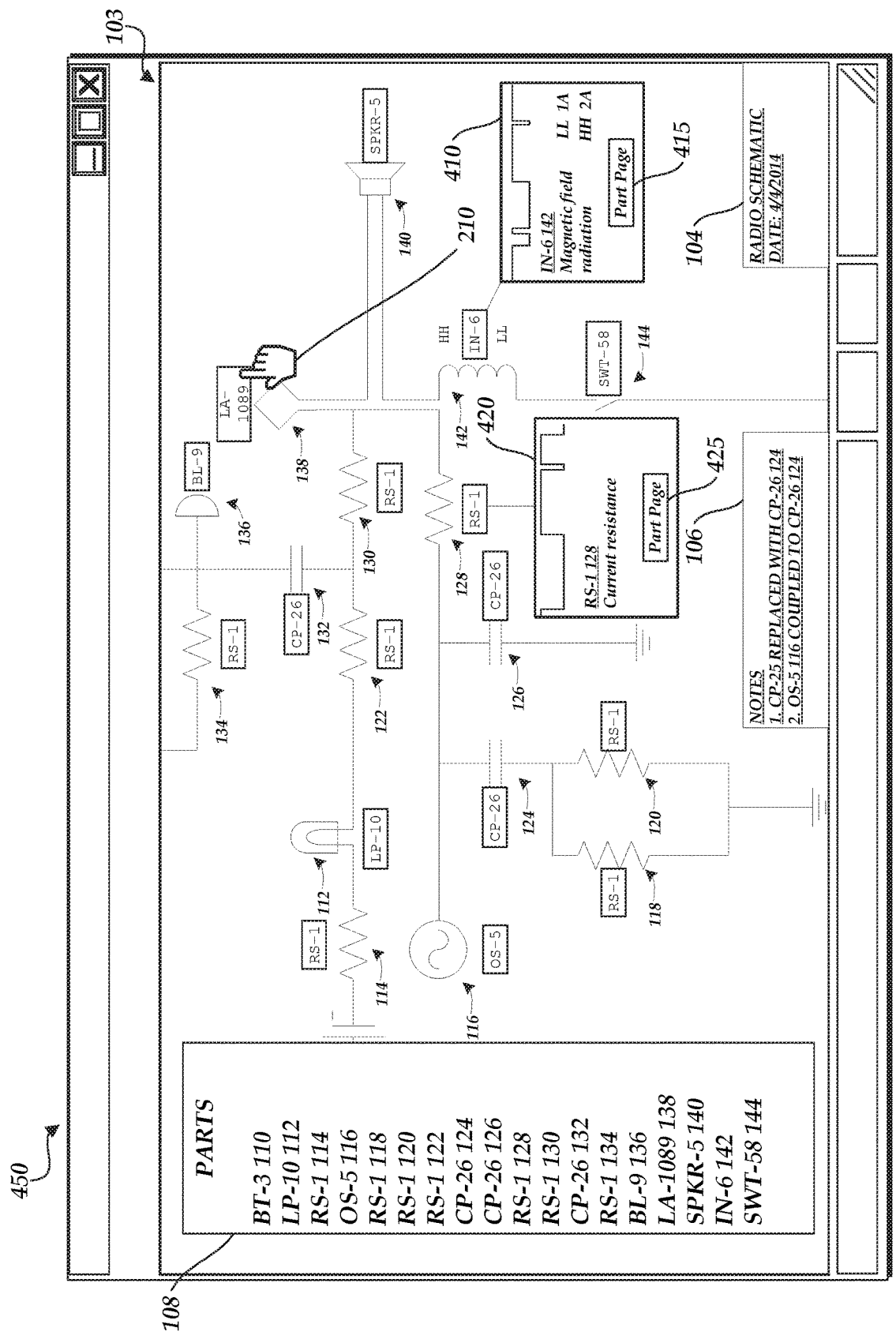
FIGS. 4G-H illustrate user interfaces displaying the addition of a note to the schematic layout that is associated with a physical component.
Figure 4H:
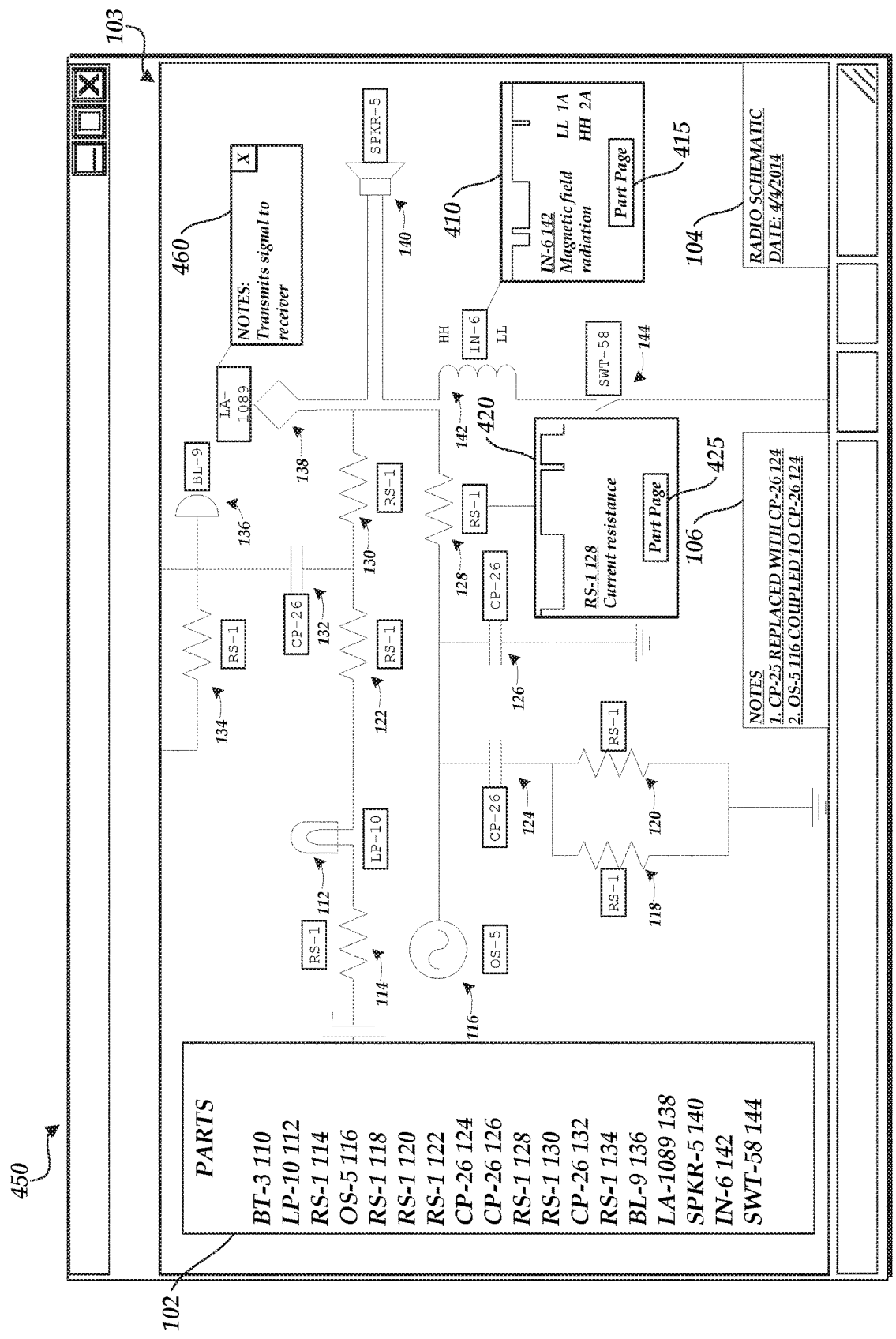

FIGS. 4G-H illustrate user interfaces 450 displaying the addition of a note associated with a physical component. As illustrated in FIG. 4G, the user may select the loop antenna 138 via the cursor 210. As illustrated in FIG. 4H, upon selection of the loop antenna 138, a notes window 460 appears in the user interface 450 near a location of the loop antenna 138, displaying notes that had previously been associated with the physical component in some embodiments. The user may enter text in the notes window 460 and the notes window 460 may stay visible in the user interface 450 until the user closes the notes window 460. In some implementations, the notes window 460 is associated with the schematic layout and automatically appears when a user later reloads the schematic layout, without any additional user action.

Figure 5A:
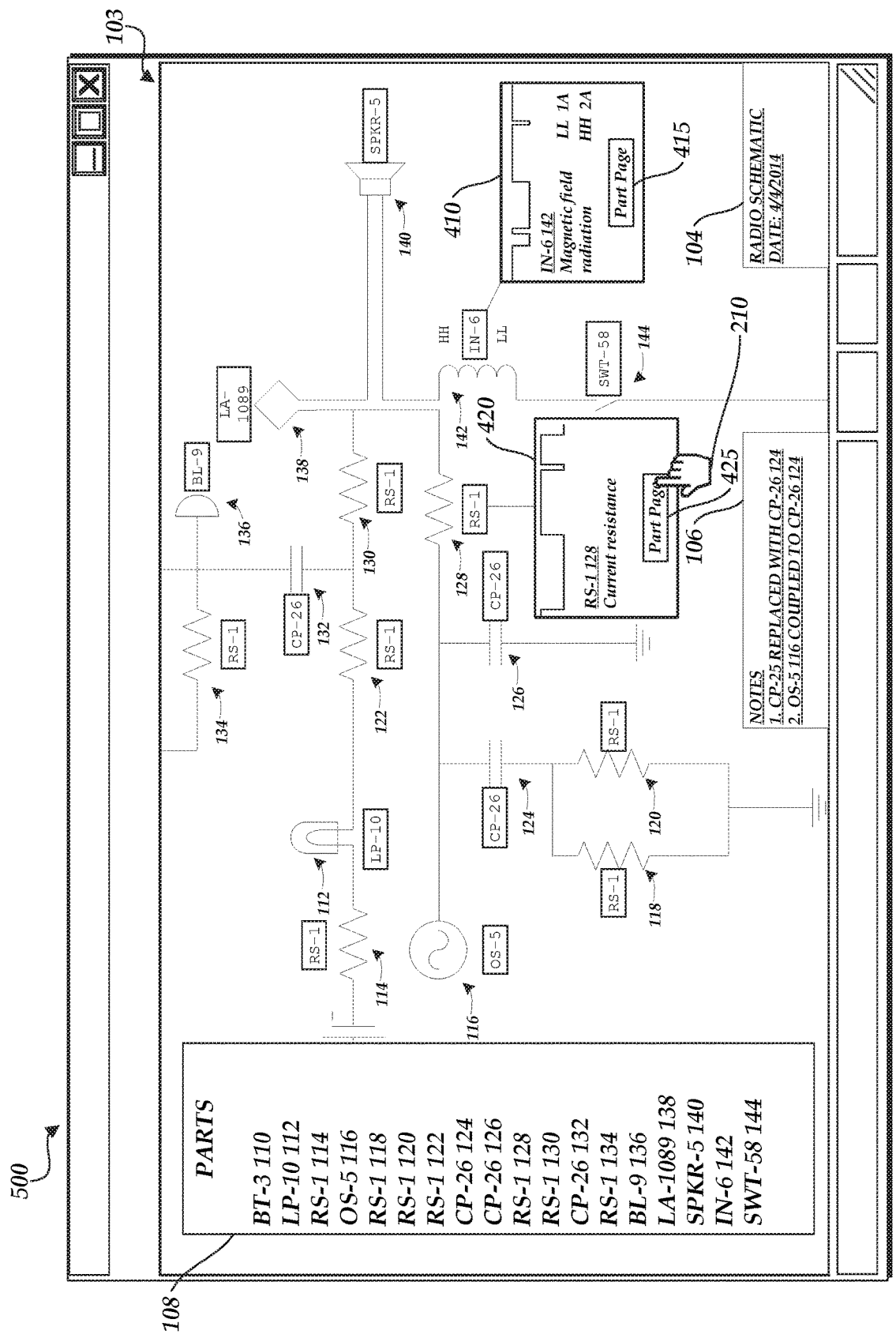
FIGS. 5A-C illustrate user interfaces displaying a page providing information about a physical component.
Figure 5B:
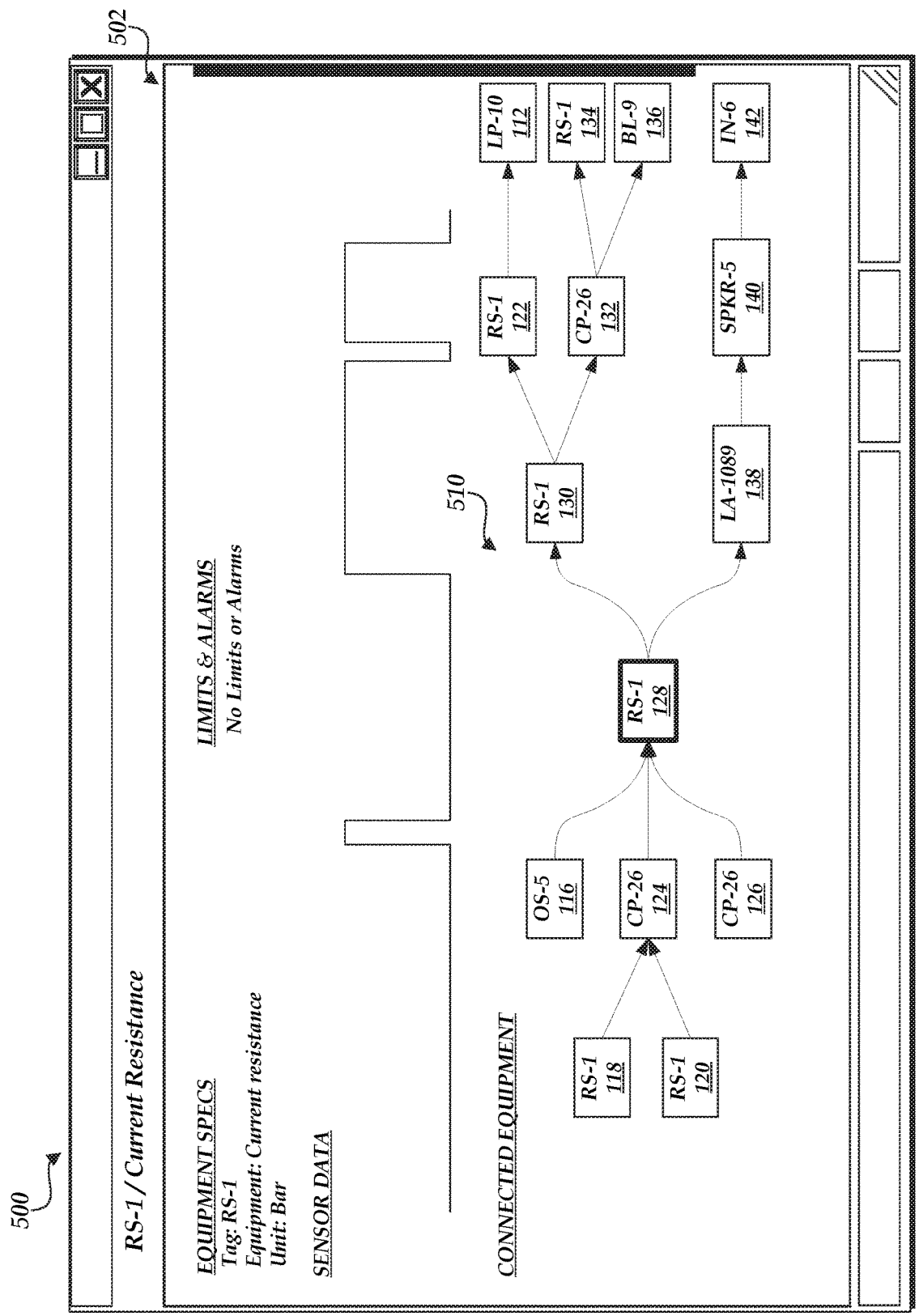
Figure 5C:
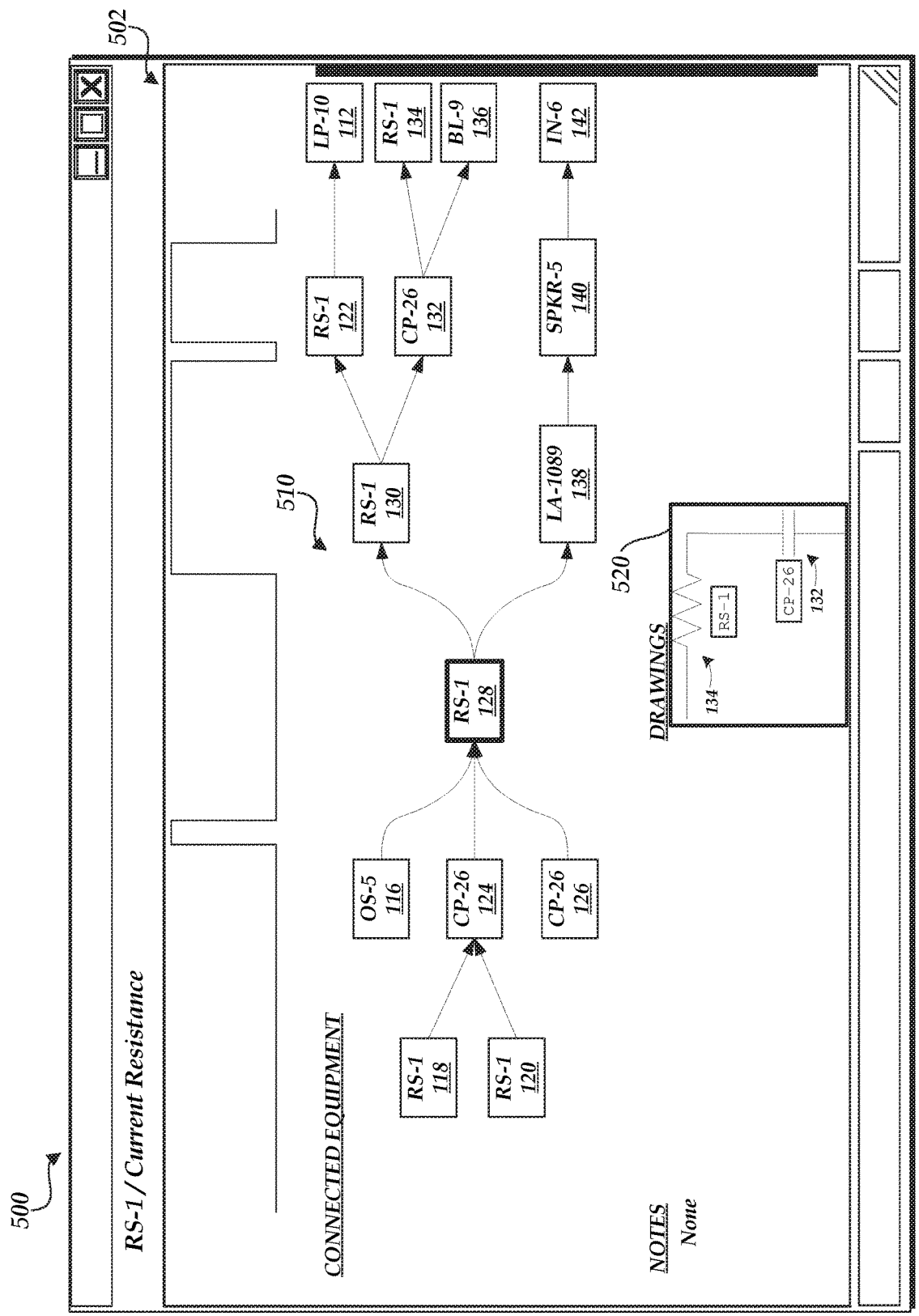

FIGS. 5A-C illustrate user interfaces 500 displaying a page providing information about a physical component. As described above, the window 420 is associated with the resistor 128. As illustrated in FIG. 5A, the user may select the part page button 425 in the window 420 via the cursor 210.

Upon selection of the part page button 425, the user interface 500 displays a page 502 that provides additional information about the resistor 128, as illustrated in FIG. 5B. For example, the page 502 may include specifications of the resistor 128, limits and alarms associated with the resistor 128, a graph depicting sensor data measured by the resistor 128 or detected on the resistor 128 (e.g., a current, a voltage, etc.), and/or other physical components and their relation to the resistor 128.

In an embodiment, the relationship between the resistor 128 and the other physical components may be generated based on the schematic layout in the digital image 103. For example, by parsing the digital image 103, the computing system 1000 may recognize connectors (e.g., conductors, wires, pipes, conduits, etc.) that connect one or more physical components together. Based on these recognized connectors, the computing system 1000 may generate a graph (or other visualization) that depicts the connections between physical components in a block diagram 510 and/or the direction of flow of substances between physical components (as represented by arrows in FIGS. 5A-5C). As shown in the block diagram 510, a block representing the resistor 128 may be in the center and physical components coupled to the resistor 128 may be depicted to the right and left of the resistor 128. The block diagram 510 may further depict physical components coupled to the physical components coupled to the resistor 128, and so on.

As illustrated in FIG. 5C, the page 502 may further include a notes section that may provide information about the resistor 128 and a drawings section that includes icons representing schematics in which the resistor 128 can be found. The image depicted in an icon shows the location around the part or component that was selected (e.g., resistor 128 in this case). For example, the icon 520 may be selectable and, upon selection by the user, may redirect the user such that the user interface 500 displays the digital image illustrating the schematic associated with the icon 520 centered and/or zoomed in on the selected part or component (e.g., selection of the icon 520 causes the user interface 500 to display the digital image 103 centered and/or zoomed in on the resistor 128, in this case).

Figure 6A:
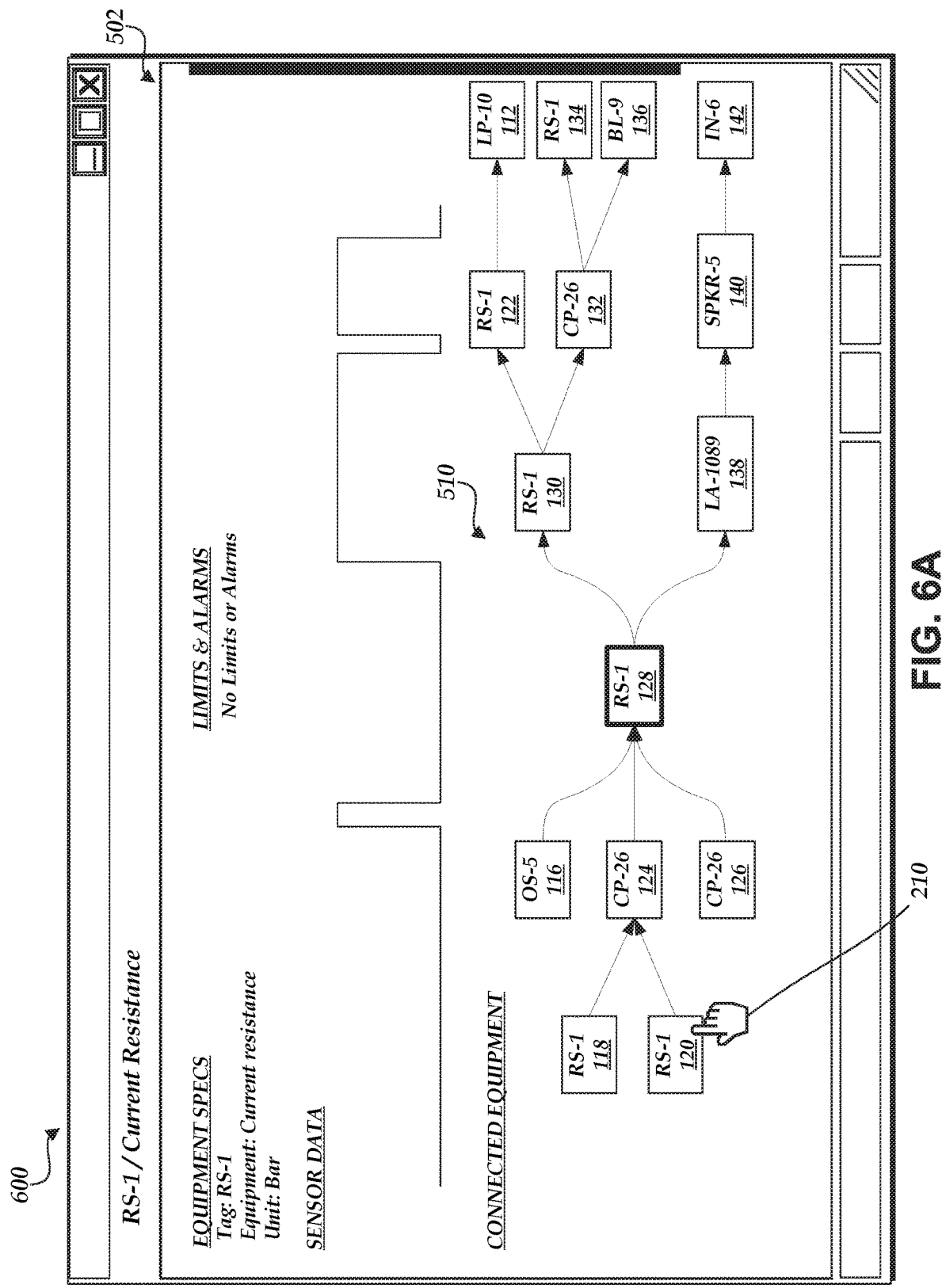
FIGS. 6A-B illustrate user interfaces displaying a page providing information about another physical component that is selected.
Figure 6B:
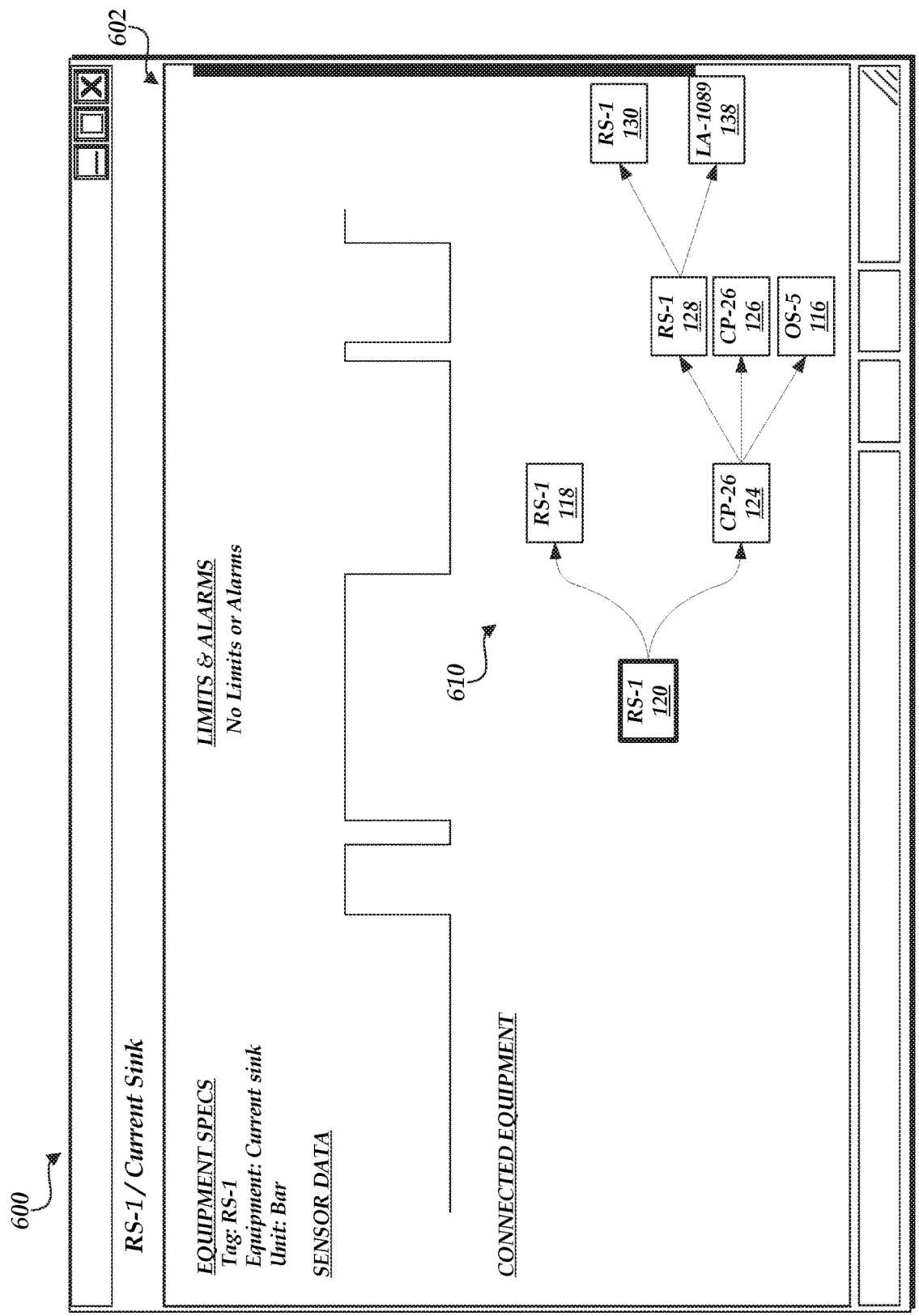

FIGS. 6A-B illustrate user interfaces 600 displaying a page providing information about another physical component that is selected. As illustrated in FIG. 6A, the user may select a block representing the resistor 120 in the block diagram 510 via the cursor 210. Upon selection of the block representing the resistor 120, the user interface 600 may display a page 602 associated with the resistor 120.

As shown in page 602, the page 602 may include specifications associated with the resistor 120, limits and alarms associated with the resistor 120, a graph depicting sensor data measured by the resistor 120 or detected on the resistor 120 (e.g., a current, a voltage, etc.), a block diagram 610 depicting the relationship between the resistor 120 and physical components located nearby Like with the block diagram 510, the block diagram 610 may depict the block representing the resistor 120 in the center.

In a further embodiment, the user can view an animation of a substance (e.g., oil, water, gas, current, voltage, etc.) as it is expected to pass through various physical components depicted in the digital image 103 (or in the block diagrams 510 and/or 610). The animation can be used to visualize historical data over time (e.g., historical sensor data that indicates how the substance has flowed through the physical components in the past in the current configuration of components) or to simulate the operation of the physical components in the current configuration of components using hypothetical data (e.g., a physical model describing the physical components in the current configuration and/or sample data to use in the simulation). For example, the user can select a physical component to serve as a starting point for the animation, choose a substance, and request to view an animation of the substance as it flows through the selected physical component as well as nearby physical components. The user can select whether the animation is to visualize historical data or whether the animation is to simulate a hypothetical scenario. The user can also select a time range for the animation (e.g., 1 minute, 1 hour, 1 day, 1 week, 1 month, 1 year, etc.). The user interface 100, 200, 300, 400, 450, 500, or 600 may include playback controls such that the user can play, pause, stop, rewind, and/or fast forward the animation.

If the user has indicated that the animation is for visualizing historical data, when the user selects the play option, the animation can show values associated with the substance historically measured at individual time instants as the substance passes through physical components during the selected time period (e.g., the historically measured values may be overlaid on the various components depicted in the user interface 100, 200, 300, 400, 450, 500, or 600). The animation may also or in the alternative be set to include a select number of physical components (e.g., the animation may progress until the substance reaches all selected physical components). The physical components that are a part of the animation may be highlighted or otherwise emphasized in the digital image 103 (or in the block diagrams 510 and/or 610). A timer may be displayed in the user interface 100, 200, 300, 400, 450, 500, or 600 to indicate a time that the substance reaches each physical component. Thus, the user may be able to visualize the flow of a substance as it passed through various physical components. The user can use this information to identify issues with the physical components, possible ways to reroute the substance if an issue with a particular physical component occurs, identify ways to efficiently route the substance, and/or the like.

If the user has indicated that the animation is for simulating hypothetical data, when the user selects the play option, the animation can simulate how changes to physical components or settings of physical components may impact operation of the system by displaying simulated values overlaid on the various components depicted in the user interface 100, 200, 300, 400, 450, 500, or 600. The user interface 100, 200, 300, 400, 450, 500, or 600 may display the same or similar information as displayed when the user has indicated that the animation is for visualizing historical data. For example, the animation may also or in the alternative be set to include a select number of physical components (e.g., the animation may progress until the substance reaches all selected physical components). The physical components that are a part of the animation may be highlighted or otherwise emphasized in the digital image 103 (or in the block diagrams 510 and/or 610). A timer may be displayed in the user interface 100, 200, 300, 400, 450, 500, or 600 to indicate a time that the substance reaches each physical component. Thus, the user may be able to visualize and model the flow of a substance as it would pass through various physical components. As described above, the user can use this information to identify issues with the physical components in a simulated configuration, possible ways to reroute the substance if an issue with a particular physical component is expected to occur, identify ways to efficiently route the substance, and/or the like.

Additionally, any graphs of sensor data that are displayed while an animation is presented (either based on historical or hypothetical data) may be updated to include an indicator on the graph associated with the current state of that sensor in the animation, where the indicator may dynamically move (e.g., from left to right across the graph) as the animation is played.

Figure 7A:
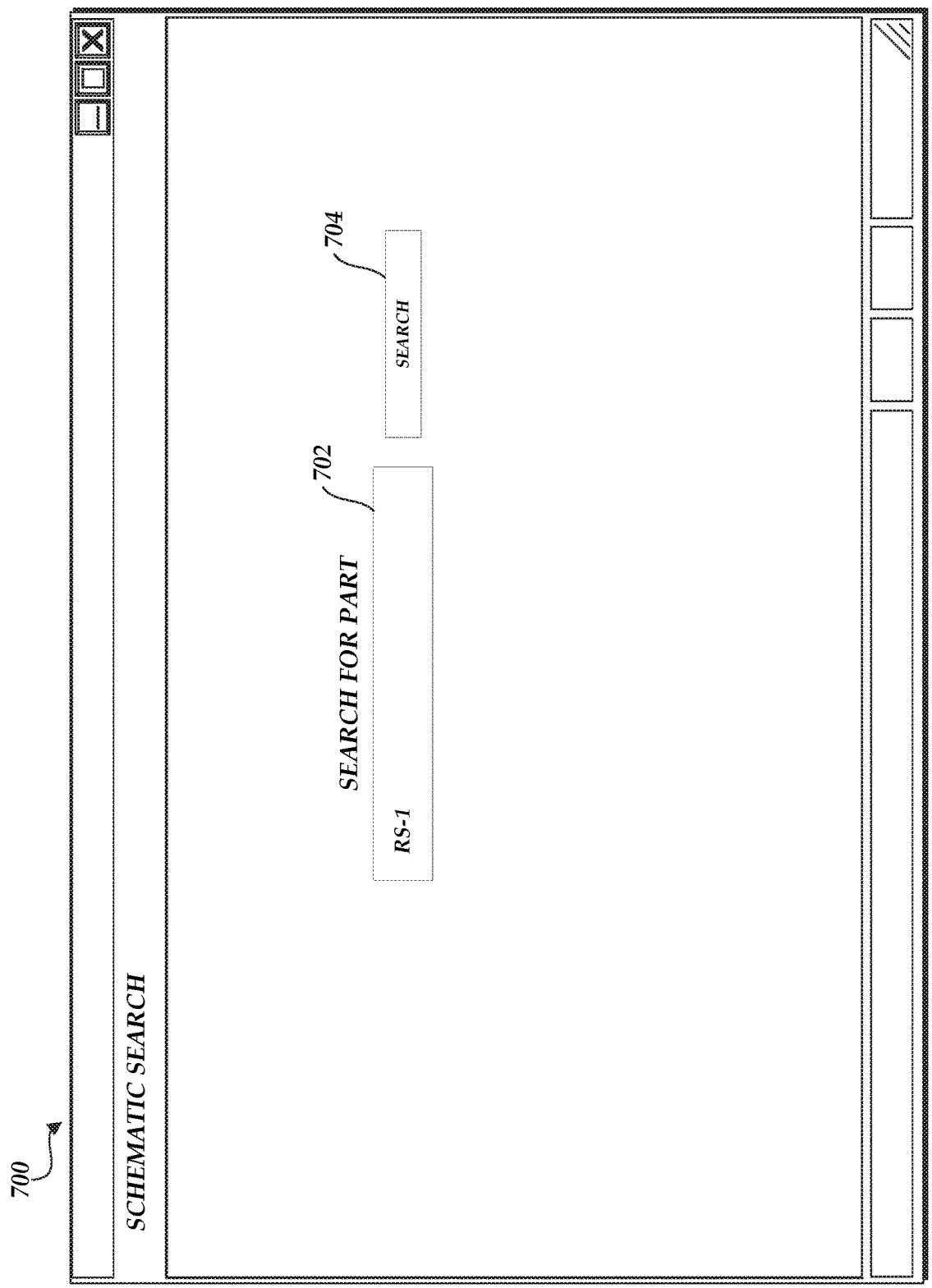
FIGS. 7A-C illustrate user interfaces displaying a process for searching for a physical component of a particular interactive schematic or multiple schematics.
Figure 7B:
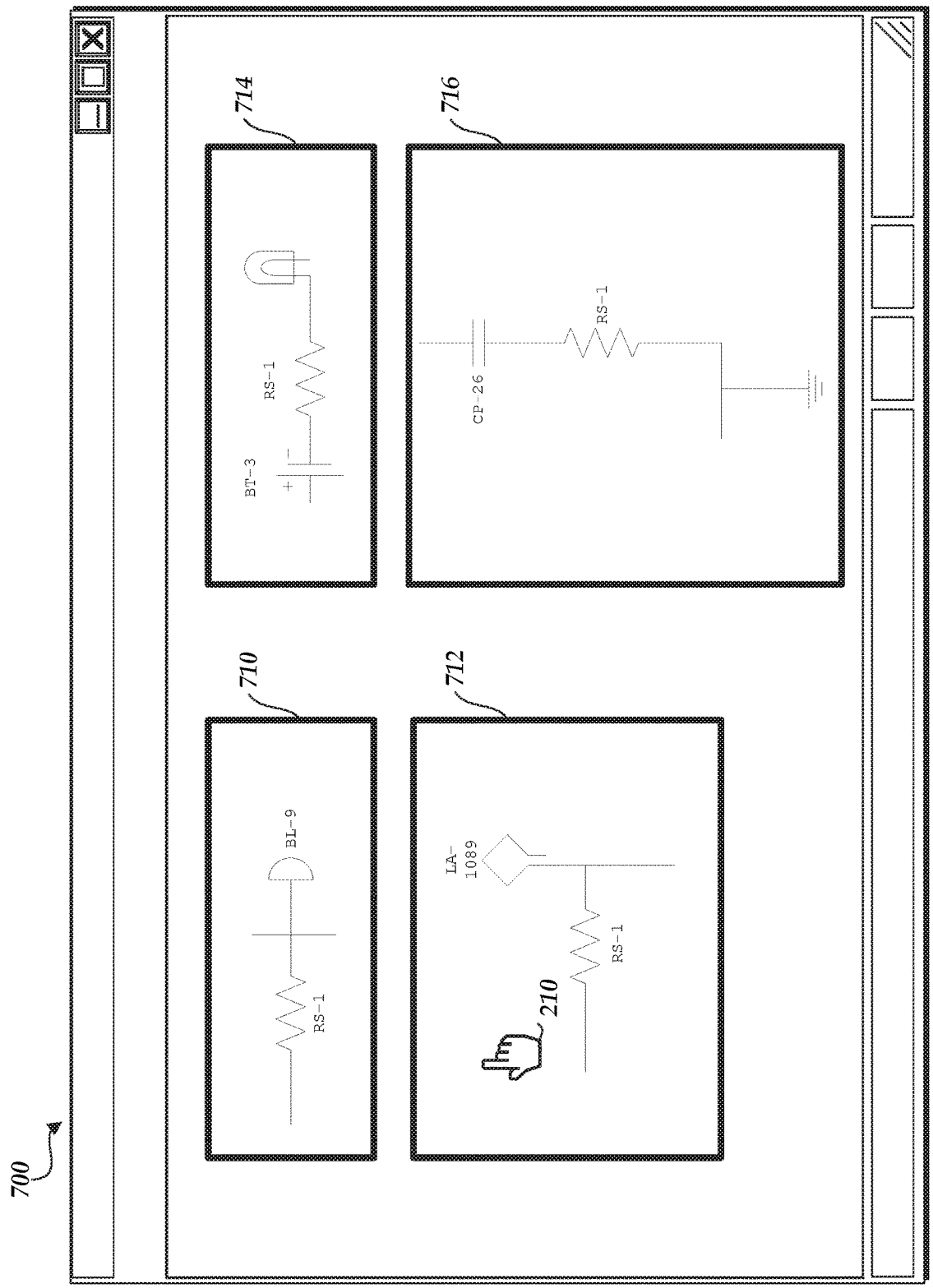
Figure 7C:
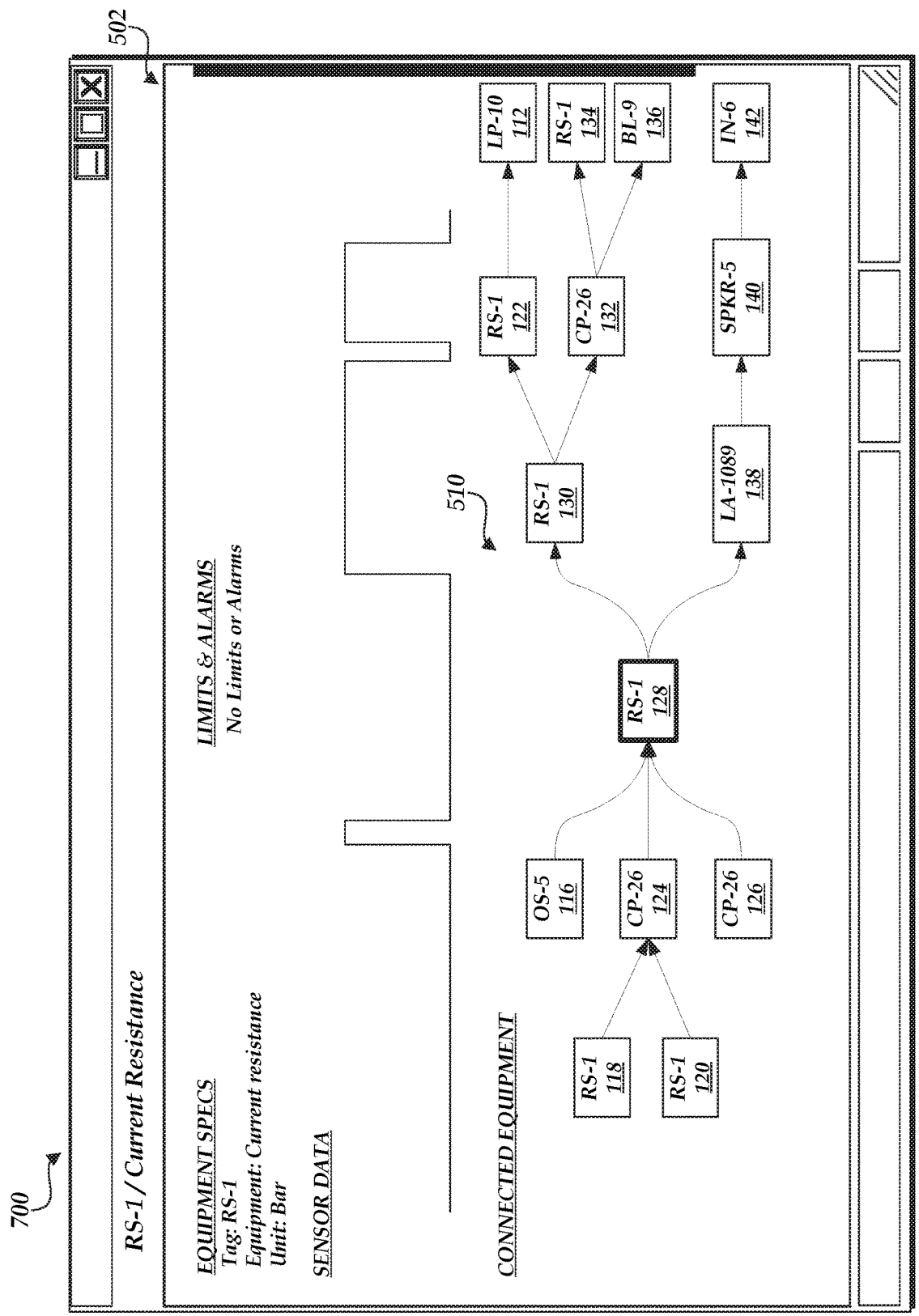

FIGS. 7A-C illustrate user interfaces 700 displaying a process for searching for a physical component of a particular interactive schematic or multiple schematics. As illustrated in FIG. 7A, the user may enter a search term in a search field 702. For example, the user may search for the term "RS-1," which refers to a resistor, and confirm the selection by selecting search button 704. In some embodiments, a similar search interface may be included as part of the user interfaces depicting portions of the interactive schematic also.

As illustrated in FIG. 7B, upon selection of the search button 704, the user interface 700 may include a list of selectable results 710, 712, 714, and/or 716 that correspond with the search term. For example, the results 710, 712, 714, and/or 716 may be selectable icons that represent graphical representations of various physical components matching or nearly matching the search term, "RS-1" in this example. In an embodiment, the user selects the search result 712, which corresponds with the resistor 128, via the cursor 210.

As illustrated in FIG. 7C, upon selection of the search result corresponding to the resistor 128, the user interface 700 may depict the page 502 corresponding to the resistor 128. The user may then be able to view information about the resistor 128 and/or view schematics in view the resistor 128 can be found, as described above. Depending on user preferences and/or system defaults, selection of a search result may result in display of the interactive schematic where the selected component is included, along with some visual effect to make location of the selected physical component by the user easier.

Example Use Case of an Interactive User Interface Depicting a Parsed Digital Image As an example, the user interface may include an interactive schematic that illustrates various selectable physical components that may be a part of an oil well platform, such as injectors, wellhead test separators, wellhead production separators, and/or the like. The user interface may also include an index that lists the physical components that can be found in the schematic of the oil well platform. Selecting any of the physical components depicted in the user interface may cause the user interface to display a page providing more information about the selected physical component, as described herein.

Example Process Flow

Figure 8:
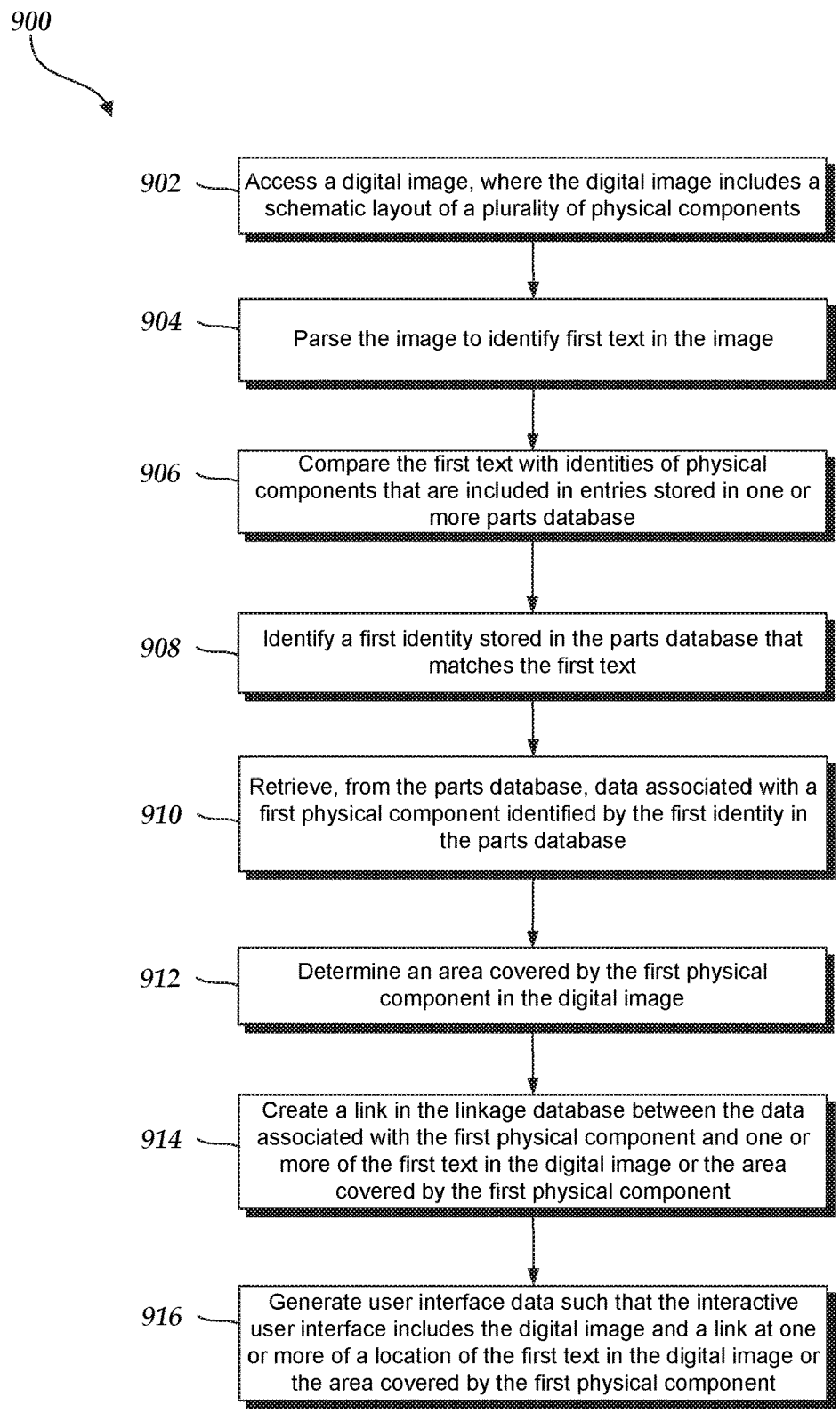
FIG. 8 is a flowchart depicting an illustrative operation of linking data with physical components in a schematic.

FIG. 8 is a flowchart 900 depicting an illustrative operation of linking data with physical components in a schematic. Depending on the embodiment, the method of FIG. 8 may be performed by various computing devices, such as by the computing system 1000 described below. Depending on the embodiment, the method of FIG. 8 may include fewer and/or additional blocks and the blocks may be performed in an order different than illustrated.

In block 902, a digital image is accessed. The digital image may include a schematic layout of a plurality of physical components. For example, the physical components may be components or devices found in an oil well platform.

In block 904, the image is parsed to identify first text in the image. The first text in the image may correspond with a physical component depicted in the schematic.

In block 906, the first text is compared with identities of physical components that are included in entries stored in one or more parts databases. For example, parts databases may include entries for various physical components that include the physical component's identity, sensor data, characteristics, descriptions, and/or the like. Different parts databases may be used for different types of components. For example, in the oil well platform example above, a first parts database may be accessed to get information on electrical sensor components, while another parts database is accessed to obtain data about fluid valves, pipes, and components. As noted above, information located in the multiple databases may be copied to the linkage database and/or may be referred to in the linkage database so that it is easily accessible to users.

In block 908, a first identity stored in a parts database (of possibly multiple databases that are searched) is identified that matches the first text. For example, the first text may be the name of a physical component that is also found in the parts database.

In block 910, data associated with a first physical component identified by the first identity in the parts database may be retrieved from the parts database. For example, the data may include characteristics of the first physical component, sensor data measured by or derived from the first physical component, and/or the like.

In block 912, an area covered by the first physical component is determined in the digital image. For example, the area covered by the first physical component may be near or at the same location as the first text.

In block 914, a link in the linkage database is created between the located data associated with the first physical component and one or more of the first text in the digital image or the area covered by the first physical component and/or first text. Such linkage allows the system to, upon selection of the first physical component in the schematic, access the data reference in the linkage database and display the data according to user preferences.

In block 916, user interface data is generated such that the interactive user interface includes the digital image and a link at one or more of a location of the first text in the digital image or the area covered by the first physical component. In an embodiment, selection of the first text or the area covered by the first physical component may result in a new window appearing in the interactive user interface displaying the linked data or a new page appearing in the interactive user interface that displays the linked data.

In an embodiment, data associated with a specific physical component is automatically linked to the physical component (e.g., if there is only one part of a particular part number in a system, historical sensor data stored in one or more databases in association with the part number may be automatically linked to the physical component identified in the schematic as being associated with the part number). In other embodiments, a user is provided with a user interface that allows for the linking of physical components located in the schematic to other data (e.g., historical sensor data) of the physical components. In addition, as future sensor data is added to the one or more databases in association with the other data, the future sensor data may be automatically linked to the located physical components such that the future sensor data can be viewed in the user interface.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 9 is a block diagram that illustrates a computer system 1000 upon which an embodiment may be implemented. For example, any of the computing devices discussed herein may include some or all of the components and/or functionality of the computer system 1000.

Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. Main memory 1006 may also store cached data, such as zoom levels and maximum and minimum sensor values at each zoom level.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions. For example, the storage device 1010 may store measurement data obtained from a plurality of sensors.

Computer system 1000 may be coupled via bus 1002 to a display 1012, such as a cathode ray tube (CRT) or LCD display (or touch screen), for displaying information to a computer user. For example, the display 1012 can be used to display any of the user interfaces described herein with respect to FIGS. 1A through 8. An input device 1014, including alphanumeric and other keys, is coupled to bus 1002 for communicating information and command selections to processor 1004. Another type of user input device is cursor control 416, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 406, from which processor 1004 retrieves and executes the instructions. The instructions received by main memory 1006 may retrieve and execute the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
a computer processor; and
a computer readable storage medium storing program instructions configured for execution by the computer processor in order to cause the computing system to:
access a digital image, wherein the digital image includes a schematic layout of a first physical component and a second physical component;
parse the digital image to create a link between first data associated with the first physical component and second data associated with the second physical component, wherein the first data is different than the second data;
generate user interface data such that a user interface displays the digital image in a first window;
in response to selection of the first physical component in the user interface, update the user interface data such that the user interface concurrently displays the first window and a second window, wherein the second window includes at least a portion of the first data associated with the first physical component; and
in response to selection of the second physical component in the user interface, update the user interface data such that the user interface concurrently displays the first window, the second window, and a third window, wherein the third window is different than the first and second windows, wherein the third window includes at least a portion of the second data associated with the second physical component, and wherein a user-selected change to a visualization in the third window causes a corresponding change to a visualization in the second window,
wherein the second window is displayed near the first physical component and the third window is displayed near the second physical component, and wherein the second window and third window concurrently at least partially cover respective portions of the digital image in the user interface; and
in response to a selection of the portion of the first data associated with the first physical component corresponding to a first time, update the user interface data such that the user interface includes a marker in the third window at a location of the portion of the second data associated with the second physical component that corresponds with the first time.

2. The computing system of claim 1, wherein the computer readable storage medium further stores program instructions that cause the computing system to associate one or more data series associated with the first physical component, the one or more data series including historical data regarding input values and output values associated with the first physical component.

3. The computing system of claim 1, wherein the first data associated with the first physical component comprises sensor data measured by the first physical component.

4. The computing system of claim 1, wherein the first data associated with the first physical component comprises a graph depicting a relationship between the first physical component and other physical components illustrated in the schematic layout.

5. The computing system of claim 1, wherein the second data comprises sensor data measured by the second physical component.

6. The computing system of claim 1, wherein the computer readable storage medium further stores program instructions that cause the computing system to, in response to a command to zoom in on the second window to a first zoom level corresponding to a first data range along a y-axis, update the user interface data such that the user interface zooms in on the third window to the first zoom level so that the portion of the first data associated with the first physical component is displayed for the first data range along the y-axis and the portion of the second data associated with the second physical component is displayed for the first data range along the y-axis.

7. The computing system of claim 1, wherein the user interface includes an index window that lists identities for the first physical component and the second physical component illustrated in the schematic layout, and wherein the computer readable storage medium further stores program instructions that cause the computing system to, in response to a selection of an identity of the first physical component, update the user interface data to adjust a location of the digital image in the user interface such that a representation of the first physical component in the schematic layout is centered in the user interface.

8. The computing system of claim 1, wherein the user interface includes a notes window that identifies previous changes to the schematic layout, and wherein the computer readable storage medium further stores program instructions that cause the computing system to, in response to a selection of a first note listed in the notes window, update the user interface data such that the user interface identifies a third physical component illustrated in the schematic layout that is associated with the first note.

9. The computing system of claim 1, wherein the computer readable storage medium further stores program instructions that cause the computing system to, in response to the selection of the first physical component in the user interface, update the user interface data such that the user interface displays a note associated with the first physical component.

10. The computing system of claim 1, wherein the computer readable storage medium further stores program instructions that cause the computing system to:
identify one or more connectors that connect the first physical component to a third physical component;
generate a graph depicting the first physical component, the third physical component, the one or more connectors that connect the first physical component to the third physical component, and a direction of flow of a substance between the first physical component and the third physical component; and
in response to a selection of a part page button in the user interface, update the user interface data such that the user interface displays the generated graph.

11. The computing system of claim 1, wherein the computer readable storage medium further stores program instructions that cause the computing system to, in response to a request to animate a flow of data through one or more of the first physical component or the second physical component, update the user interface data such that the user interface includes an animation that indicates a sensor value as a substance passes through the first physical component at a second first time and the sensor value as the substance passes through the second physical component at a third second time after the second first time.

12. The computing system of claim 1, wherein the animation visualizes one of historical sensor data or hypothetical data.

13. The computing system of claim 1, wherein the computer readable storage medium further stores program instructions that cause the computing system to, in response to an input providing model sensor data for the first physical component, update the user interface data such that the user interface includes a prediction of a sensor value for a third physical component that is coupled to the first physical component.

14. A computer-implemented method comprising:
accessing a digital image, wherein the digital image includes a schematic layout of a first physical component and a second physical component;
parsing the digital image to create a link between first data associated with the first physical component and second data associated with the second physical component, wherein the first data is different than the second data;
generating user interface data such that a user interface displays the digital image in a first window;
in response to selection of the first physical component in the user interface, updating the user interface data such that the user interface concurrently displays the first window and a second window, wherein the second window includes at least a portion of the first data associated with the first physical component; and
in response to selection of the second physical component in the user interface, updating the user interface data such that the user interface concurrently displays the first window, the second window, and a third window, wherein the third window is different than the first and second windows, wherein the third window includes at least a portion of the second data associated with the second physical component, and wherein a user-selected change to a visualization in the third window causes a corresponding change to a visualization in the second window,
wherein the second window is displayed near the first physical component and the third window is displayed near the second physical component, and wherein the second window and the third window concurrently at least partially cover respective portions of the digital image in the interface; and
in response to a selection of the portion of the first data associated with the first physical component corresponding to a first time, update the user interface data such that the user interface includes a marker in the third window at a location of the portion of the second data associated with the second physical component that corresponds with the first time.

15. The computer-implemented method of claim 14, wherein the first data associated with the first physical component comprises sensor data measured by the first physical component and a graph depicting a relationship between the first physical component and other physical components illustrated in the schematic layout.

16. The computer-implemented method of claim 14, wherein the second data comprises sensor data measured by the second physical component.

17. The computer-implemented method of claim 14, further comprising, in response to a command to zoom in on the second window to a first zoom level corresponding to a first data range along a y-axis, updating the user interface data such that the user interface zooms in on the third window to the first zoom level so that the portion of the first data associated with the first physical component is displayed for the first data range along the y-axis and the portion of the second data associated with the second physical component is displayed for the first data range along the y-axis.

18. A non-transitory, computer-readable storage medium storing computer-executable instructions, which if performed by one or more processors, cause the one or more processors to at least:
access a digital image, wherein the digital image includes a schematic layout of a first physical component and a second physical component;
parse the digital image to create a link between first data associated with the first physical component and second data associated with the second physical component, wherein the first data is different than the second data;
generate user interface data such that a user interface displays the digital image in a first window;
in response to selection of the first physical component in the user interface, update the user interface data such that the user interface concurrently displays the first window and a second window, wherein the second window includes at least a portion of the first data associated with the first physical component; and in response to selection of the second physical component in the user interface, update the user interface data such that the user interface concurrently displays the first window, the second window, and a third window, wherein the third window is different than the first and second windows, wherein the third window includes at least a portion of the second data associated with the second physical component, and wherein a user-selected change to a visualization in the third window causes a corresponding change to a visualization in the second window, wherein the second window is displayed near the first physical component and the third window is displayed near the second physical component, and wherein the second window and third window concurrently at least partially cover respective portions of the digital image in the user interface; and in response to a selection of the portion of the first data associated with the first physical component corresponding to a first time, update the user interface data such that the user interface includes a marker in the third window at a location of the portion of the second data associated with the second physical component that corresponds with the first time.

* * * * *